United States Patent
Weijnen et al.

(10) Patent No.: US 10,202,513 B2
(45) Date of Patent: Feb. 12, 2019

(54) COATING COMPOSITION COMPRISING ANTI-SKINNING AGENT

(71) Applicant: PPG Coatings Europe B.V., Amsterdam (NL)

(72) Inventors: John Weijnen, Alphen aan den Rijn (NL); Cornelis Brandjes, Akersloot (NL)

(73) Assignee: PPG Coatings Europe B.V., Amsterdam (NL)

( * ) Notice: Subject to any disclaimer, the term of this patent is extended or adjusted under 35 U.S.C. 154(b) by 0 days.

(21) Appl. No.: 15/517,930

(22) PCT Filed: Oct. 9, 2014

(86) PCT No.: PCT/EP2014/071675
§ 371 (c)(1),
(2) Date: Apr. 7, 2017

(87) PCT Pub. No.: WO2016/055114
PCT Pub. Date: Apr. 14, 2016

(65) Prior Publication Data
US 2017/0253752 A1    Sep. 7, 2017

(51) Int. Cl.
| | | |
|---|---|---|
| *C08K 5/07* | (2006.01) | |
| *C08K 5/33* | (2006.01) | |
| *C08G 18/42* | (2006.01) | |
| *C09D 7/46* | (2018.01) | |
| *C09D 7/63* | (2018.01) | |
| *C09D 167/08* | (2006.01) | |

(52) U.S. Cl.
CPC ........... *C09D 7/63* (2018.01); *C08G 18/4288* (2013.01); *C09D 167/08* (2013.01); *C08K 5/07* (2013.01); *C08K 5/33* (2013.01); *C09D 7/46* (2018.01)

(58) Field of Classification Search
CPC ...... C09D 7/63; C09D 7/1233; C09D 167/08; C09D 7/46; C08K 5/07; C08K 5/33; C08G 18/4288
See application file for complete search history.

(56) References Cited

U.S. PATENT DOCUMENTS

| | | | | |
|---|---|---|---|---|
| 4,631,087 A | * | 12/1986 | Turner | ................. C09D 167/08 106/252 |
| 6,730,157 B2 | * | 5/2004 | Steinert | .................... C09D 7/63 106/263 |
| 2007/0049657 A1 | * | 3/2007 | Martyak | .................. C09D 7/46 523/160 |

* cited by examiner

*Primary Examiner* — Patrick D Niland
(74) *Attorney, Agent, or Firm* — Krisanne Shideler

(57) ABSTRACT

The invention relates to a coating composition comprising an oxidatively drying binder and an anti-skinning agent, the anti-skinning agent comprising: a) a diketone of formula (I) (b) an aldoxime or ketoxime of formula (II) wherein $R^1$, $R^2$, $R^3$, $R^4$ and n have the same meaning as that defined by the present application.

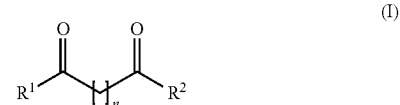

(I)

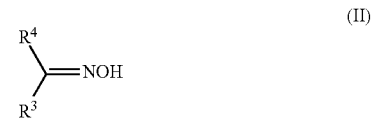

(II)

15 Claims, No Drawings

COATING COMPOSITION COMPRISING ANTI-SKINNING AGENT

FIELD OF THE INVENTION

The invention relates to a coating composition comprising an oxidatively drying binder, preferably the invention relates to an autoxidisable alkyd based coating composition.

BACKGROUND OF THE INVENTION

Air drying solvent based alkyds are generally prepared by transesterification and condensation reactions of three types of monomers: polyalcohols, polybasic acids and unsaturated fatty acids or the corresponding oils. In the chemical curing process of alkyd binders, the presence of unsaturated fatty acid chains is essential. Polymeric network formation takes place by the crosslinking of the fatty acids moieties of the resin. The number of unsaturated bonds in the fatty acids determines whether the oils are classified as non-drying, semi-drying or drying oils. The architecture of the fatty acids, such as whether or not the double bonds are conjugated and the configuration of the double bonds, has also an effect on the drying speed.

The chemical curing of air-drying systems is a rather complex process composed of oxidation reactions, radical formation and crosslinking leading to a polymeric network.

Since the drying process proceeds slowly, metal based driers are added to catalyze the reaction. Driers are typically metal soaps of either transition metals or alkaline-earth metals. Driers are classified by function, specifically: surface driers, through driers and auxiliary driers. Surface driers are characterized by having at least two accessible valence states and catalyze the autoxidative curing process. Through driers promote curing beneath the surface of the coating film and auxiliary driers interact with the surface driers.

A liquid coating composition containing unsaturated fatty acids and metal driers, when exposed to air, will rapidly convert into a drying polymeric matrix. The formation of surface skin on air-drying coatings results from the same drier catalyzed oxidative polymerization processes. Even in a closed container, in which the ullage between the product surface and the closed lid is sufficiently large, a tough rubber-like skin on the surface of the liquid coating material will develop. To prevent untimely oxidative drying leading to skinning of the alkyd paint and to improve the stability during storage, anti-skinning agents are included in the formulation.

Skinning in the paint container during storage results in loss of quality and quantity of the coating product. Removal of the skin is both awkward and time consuming and results in a waste of a substantial amount of paint. Moreover, the concentration of driers found in the skin is disproportionate and removal will lead to a prolongation of drying time of the remaining coating material.

Anti-skinning agents prevent early oxidative drying by binding oxygen, acting as radical scavengers or by complexing to and thereby inactivating the metal drier. The different types of anti-skinning agents described in the literature include substituted phenols, hydroquinones, aliphatic and aromatic amines, tin compounds, azones, α-hydroxyketones, hydroxylamines, β-dicarbonyl compounds, natural antioxidants such as tocopherol and isoascorbates, solvents as dipentene and oximes.

The choice of the anti-skinning agent is always a compromise between preventing skin formation and retaining an adequate drying potential of the coating after application but also odour, toxicity profile and the effect on the coloristic film properties should be taken into account.

For decades, the class of oximes has been the most widely applied group of anti-skinning agents in the coating industry as a result of well-balanced properties. Particularly methyl ethyl ketoxime (MEKO) is widely used in coating formulations because of having no adverse effect on the drying time by virtue of the high volatility, long-lasting anti-skinning control in a closed container, no discoloration of the paint film, high compatibility with a wide range of coating materials and a mild odour. The mechanism associated with the anti-skinning performance of oximes is still not accepted unanimously. One of the widely encountered hypotheses concerns the association of the oxime to the free coordination sites of the metal carboxylate thereby suppressing the activity of the catalyst. During storage in a closed container the weak metal-oxime complex will stay intact. However, after opening of the can or paint application, the complex will dissociate and the relative volatile oxime will be released into the surrounding atmosphere. The equilibrium of the metal-oxime complex is shifted and the inactive oxime-drier complex is disintegrated thereby restoring the catalytic functionality of the primary drier. Alternative mechanisms suggested for the mode of actions of oximes as anti-skinning agents include the scavenging of radicals formed in the autoxidation reaction or binding free oxygen. A recent study suggests that the free radicals formed in the autoxidation reaction may readily add to the C=N double bond of the oxime, producing stable radical addition products that could inhibit further free radical chain reactions. After application and exposition of the paint to air, the addition products decompose by reaction with oxygen releasing the free radicals and the oxime evaporates.

In addition, volatile oximes vaporized in the headspace of a paint container contribute to the anti-skinning performance by providing a blanketing vapor at the paint-air interface.

Because of the volatility of MEKO, a high concentration of vapor is formed covering the liquid paint in a closed container, preventing the ingress of oxygen and the autoxidation reaction.

Discussions are ongoing to reduce the workplace exposure limit (OEL) of methyl ethyl ketoxime substantially which would impose the reduction of the concentration in a coating formulation below a technical successful level.

In the patent literature, examples of oxime-free anti-skinning agents have been described. These typically result in a poorer drying performance and reduced film hardness values.

Thus, there still exists a need for an oxime-free or strongly reduced oxime containing anti-skinning agents which in term of properties profile as long-lasting resistance to undesirable skinning, effect on drying performance, odour and tendency of discoloration of the final film is comparable to methyl ethyl ketoxime.

SUMMARY OF THE INVENTION

The inventors have surprisingly found that there is a synergistic effect of low amounts of an aldoxime or ketoxime with a diketone on the anti-skinning performance of an autoxidisable coating composition.

It is an object of the present invention to develop compositions which prevent skinning in paints and coating formulations over an extended period and do not adversely affect the drying performance of such formulations in film form. Furthermore, the film hardness values obtained of the resulting films or coatings should not be negatively influenced and no discoloration should be caused. The use levels of these products should display no disadvantageous toxicological properties.

According to a first aspect, the present invention relates to a coating composition comprising an oxidatively drying binder and an anti-skinning agent, the anti-skinning agent comprising:

a) a diketone of formula I

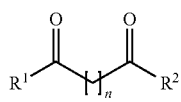

(I)

wherein n is an integer selected from 1 and 2, preferably wherein n is 1; and $R^1$ is selected from the group comprising $C_{1-24}$alkyl, $C_{6-20}$aryl, $C_{6-20}$aryl$C_{1-12}$alkyl, heteroaryl, heteroaryl $C_{1-12}$alkyl, each group being optionally substituted with one or more substituents each independently selected from the group comprising $C_{1-6}$alkyl, —OH, and halogen;

$R^2$ is selected from the group comprising $C_{1-24}$alkyl, $C_{6-20}$aryl, $C_{6-20}$aryl$C_{1-12}$alkyl, heteroaryl, heteroaryl $C_{1-12}$alkyl, each group being optionally substituted with one or more substituents each independently selected from the group comprising $C_{1-6}$alkyl, —OH, and halogen; or $R^1$ taken together with $R^2$ form a 4, 5, 6, 7, 8, 9 or 10-membered carbon ring, optionally substituted with one or more substituents each independently selected from the group comprising $C_{1-6}$alkyl, —OH, and halogen; and b) an aldoxime or ketoxime of formula II

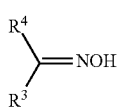

(II)

wherein $R^3$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen;

$R^4$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; or $R^3$ taken together with $R^4$ form a 5, 6, 7, 8, 9 or 10-membered carbon ring, optionally substituted with one or more substituents each independently selected from the group comprising $C_{1-6}$alkyl, —OH, and halogen.

According to a second aspect, the present invention relates to use of a composition as an anti-skinning agent in a coating composition comprising an oxidatively drying binder, wherein said composition comprises:

a) a diketone of formula I

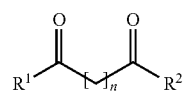

(I)

wherein n is an integer selected from 1 and 2, preferably wherein n is 1; and $R^1$ is selected from the group comprising $C_{1-24}$alkyl, $C_{6-20}$aryl, $C_{6-20}$aryl$C_{1-12}$alkyl, heteroaryl, heteroaryl $C_{1-12}$alkyl, each group being optionally substituted with one or more substituents each independently selected from the group comprising $C_{1-6}$alkyl, —OH, and halogen;

$R^2$ is selected from the group comprising $C_{1-24}$alkyl, $C_{6-20}$aryl, $C_{6-20}$aryl$C_{1-12}$alkyl, heteroaryl, heteroaryl $C_{1-12}$alkyl, each group being optionally substituted with one or more substituents each independently selected from the group comprising $C_{1-6}$alkyl, —OH, and halogen; or $R^1$ taken together with $R^2$ form a 4, 5, 6, 7, 8, 9 or 10-membered carbon ring, optionally substituted with one or more substituents each independently selected from the group comprising $C_{1-6}$alkyl, —OH, and halogen; and b) an aldoxime or ketoxime of formula II

(II)

wherein $R^3$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen;

$R^4$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; or $R^3$ taken together with $R^4$ form a 5, 6, 7, 8, 9 or 10-membered carbon ring, optionally substituted with one or more substituents each independently selected from the group comprising $C_{1-6}$alkyl, —OH, and halogen.

According to a third aspect, the invention also relates to the use of the coating composition according to the first aspect of the invention or preferred embodiments thereof, in a varnish, lacquer, paint, stain, enamel, printing ink, or floor covering.

According to a fourth aspect, the invention also relates substrate having applied thereon a coating composition according to the first aspect of the invention or preferred embodiments thereof.

Preferred embodiments of the invention are disclosed in the detailed description and appended claims. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

When describing the compositions of the invention, the terms used are to be construed in accordance with the following definitions, unless a context dictates otherwise.

As used in the specification and the appended claims, the singular forms "a", "an," and "the" include both singular and plural referents unless the context clearly dictates otherwise. By way of example, "a binder" means one binder or more than one binder.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

As used herein, the term "and/or," when used in a list of two or more items, means that any one of the listed items can be employed by itself or any combination of two or more of the listed items can be employed. For example, if a list is described as comprising group A, B, and/or C, the list can comprise A alone; B alone; C alone; A and B in combination; A and C in combination, B and C in combination; or A, B, and C in combination.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

The term "about" as used herein when referring to a measurable value such as a parameter, an amount, a temporal duration, and the like, indicate that a value includes the standard deviation of error for the device or method being employed to determine the value. Preferably the term "about" is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. All publications referenced herein are incorporated by reference thereto.

Whenever the term "substituted" is used herein, it is meant to indicate that one or more hydrogens on the atom indicated in the expression using "substituted" is replaced with a selection from the indicated group, provided that the indicated atom's normal valency is not exceeded, and that the substitution results in a chemically stable compound, i.e. a compound that is sufficiently robust to survive isolation from a reaction mixture.

The term "hydroxyl" or "hydroxy" as used herein refers to the group —OH.

The term "carboxy" or "carboxyl" or "hydroxycarbonyl" as used herein refers to the group —C(=O)OH.

The term "carboxylate" as used herein refers to the group $R^xC(=O)O-$, wherein $R^x$ is selected from H, $C_{1-22}$alkyl, $C_{2-22}$alkenyl, $C_{2-22}$alkynyl, $C_{3-8}$cycloalkyl, $C_{6-12}$aryl, $C_{1-22}$alkyl$C_{6-12}$aryl, $C_{6-12}$aryl$C_{1-22}$alkyl, $C_{1-22}$alkyl$C_{3-8}$cycloalkyl, $C_{3-8}$cycloalkyl$C_{1-22}$alkyl, or $C_{1-22}$alkyl$C_{3-8}$cycloalkyl$C_{1-22}$alkyl. Metal carboxylates have the general formula $(R^xC(=O)O)_nM$, wherein each $R^x$ is independently selected from H, $C_{1-22}$alkyl, $C_{2-22}$alkenyl, $C_{2-22}$alkynyl, $C_{3-8}$cycloalkyl, $C_{6-12}$aryl, $C_{1-22}$alkyl$C_{6-12}$aryl, $C_{6-12}$aryl $C_{1-22}$alkyl, $C_{1-22}$alkyl$C_{3-8}$cycloalkyl, $C_{3-8}$cycloalkyl $C_{1-22}$alkyl, or $C_{1-22}$alkyl$C_{3-8}$cycloalkyl$C_{1-22}$alkyl, wherein n is an integer of at least 1, for example wherein n is 1, 2, 3, 4, or 5, and wherein M is a metal.

The term "alkyl", as a group or part of a group, refers to a hydrocarbyl group of Formula —$C_nH_{2n+1}$ wherein n is a number of at least 1. Alkyl groups may be linear, or branched and may be substituted as indicated herein. Generally, the alkyl groups comprise from 1 to 24 carbon atoms, preferably from 1 to 12 carbon atoms, preferably from 1 to 10 carbon atoms, preferably from 1 to 6 carbon atoms, more preferably 1, 2, 3, 4, 5, 6 carbon atoms. When a subscript is used herein following a carbon atom, the subscript refers to the number of carbon atoms that the named group may contain. For example, the term "$C_{1-24}$alkyl", as a group or part of a group, refers to a hydrocarbyl group of Formula —$C_nH_{2n+1}$ wherein n is a number ranging from 1 to 24. Thus, for example, $C_{1-24}$alkyl groups include all linear, or branched alkyl groups having 1 to 24 carbon atoms, and thus includes for example methyl, ethyl, n-propyl, i-propyl, butyl and its isomers (e.g. n-butyl, i-butyl and t-butyl); pentyl and its isomers, hexyl and its isomers, heptyl and its isomers, octyl and its isomers, nonyl and its isomers, decyl and its isomers, undecyl and its isomers, dodecyl and its isomers, tridecyl and its isomers, tetradecyl and its isomers, pentadecyl and its isomers, hexadecyl and its isomers, heptadecyl and its isomers, octadecyl and its isomers, nonadecyl and its isomers, icosyl and its isomers, and the like. For example, $C_{1-12}$alkyl includes all linear, or branched alkyl groups having 1 to 12 carbon atoms, and thus includes for example methyl, ethyl, n-propyl, i-propyl, butyl and its isomers (e.g. n-butyl, i-butyl and t-butyl); pentyl and its isomers, hexyl and its isomers, heptyl and its isomers, octyl and its isomers, nonyl and its isomers, decyl and its isomers and the like. For example, $C_{1-6}$alkyl includes all linear, or branched alkyl groups having 1 to 6 carbon atoms, and thus includes for example methyl, ethyl, n-propyl, i-propyl, butyl and its isomers (e.g. n-butyl, i-butyl and t-butyl); pentyl and its isomers, hexyl and its isomers.

When the suffix "ene" is used in conjunction with an alkyl group, i.e. "alkylene", this is intended to mean the alkyl group as defined herein having two single bonds as points of attachment to other groups. As used herein, the term "$C_{1-12}$alkylene", by itself or as part of another substituent, refers to $C_{1-12}$alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—$CH(CH_3)$—), 1-methyl-ethylene (—$CH(CH_3)$—$CH_2$—), n-propylene (—$CH_2$—$CH_2$—$CH_2$—), 2-methylpropylene (—$CH_2$—$CH(CH_3)$—$CH_2$—), 3-methylpropylene (—$CH_2$—$CH_2$—$CH(CH_3)$—), n-butylene (—$CH_2$—$CH_2$—$CH_2$—$CH_2$—), 2-methylbutylene (—$CH_2$—$CH(CH_3)$—$CH_2$—$CH_2$—), 4-methylbutylene (—$CH_2$—$CH_2$—$CH_2$—$CH(CH_3)$—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers.

The term "amino" refers to the group —$NH_2$.

The term "cycloalkyl", as a group or part of a group, refers to a cyclic alkyl group, that is a monovalent, saturated, hydrocarbyl group having 1 or more cyclic structure, and comprising from 3 to 12 carbon atoms, more preferably from 3 to 9 carbon atoms, more preferably from 3 to 6 carbon atoms, still more preferably from 5 to 6 carbon atoms. Cycloalkyl includes all saturated hydrocarbon groups containing 1 or more rings, including monocyclic or bicyclic groups. The further rings of multi-ring cycloalkyls may be either fused, bridged and/or joined through one or more spiro atoms. When a subscript is used herein following a carbon atom, the subscript refers to the number of carbon atoms that the named group may contain. For example, the term "$C_{3-6}$cycloalkyl", a cyclic alkyl group comprising from 3 to 6 carbon atoms, more preferably from 5 to 6 carbon atoms. Examples of $C_{3-6}$cycloalkyl groups include but are not limited to cyclopropyl, cyclobutyl, cyclopentyl, cyclohexyl. Cycloalkyl groups may also be considered to be a subset of homocyclic rings discussed hereinafter. When the suffix "ene" is used in conjunction with a cycloalkyl group, i.e. cycloalkylene, this is intended to mean the cycloalkyl group as defined herein having two single bonds as points of attachment to other groups. Non-limiting examples of "$C_{3-6}$cycloalkylene" include 1,2-cyclopropylene, 1,1-cyclopropylene, 1,1-cyclobutylene, 1,2-cyclobutylene, 1,1-cyclopentylene, 1,3-cyclopentylene, and 1,4-cyclohexylene. Cycloalkyl or cycloalkylene groups may be substituted, for example with one or more alkyl groups.

The term "$C_{6-20}$aryl", as a group or part of a group, refers to a polyunsaturated, aromatic hydrocarbyl group having a single ring (i.e. phenyl) or multiple aromatic rings fused together (e.g. naphthalene), or linked covalently, typically containing 6 to 20 atoms; wherein at least one ring is aromatic, preferably comprising 6 to 12 atoms, wherein at least one ring is aromatic. The aromatic ring may optionally include one to two additional rings (either cycloalkyl, heterocyclyl or heteroaryl) fused thereto. Examples of suitable aryl include $C_{6-10}$aryl, more preferably $C_{6-8}$aryl. Non-limiting examples of $C_{6-12}$aryl comprise phenyl, biphenylyl, biphenylenyl, or 1- or 2-naphthanelyl; 5- or 6-tetralinyl, 1-, 2-, 3-, 4-, 5-, 6-, 7- or 8-azulenyl, 4-, 5-, 6 or 7-indenyl, 4- or 5-indanyl, 5-, 6-, 7- or 8-tetrahydronaphthyl, 1,2,3,4-tetrahydronaphthyl, and 1,4-dihydronaphthyl. When the suffix "ene" is used in conjunction with an aryl group, this is intended to mean the aryl group as defined herein having two single bonds as points of attachment to other groups. Suitable arylene groups include 1,4-phenylene, 1,2-phenylene, 1,3-phenylene, biphenylylene, naphthylene, indenylene, and the like. Where a carbon atom in an aryl group is replaced with a heteroatom, the resultant ring is referred to herein as a heteroaryl ring.

The term "$C_{6-20}$aryl$C_{1-12}$alkyl", as a group or part of a group, means a $C_{1-12}$alkyl as defined herein, wherein at least one hydrogen atom is replaced by at least one $C_{6-20}$aryl as defined herein. Non-limiting examples of $C_{6-12}$aryl $C_{1-12}$alkyl group include benzyl, phenethyl, dibenzylmethyl, 3-(2-naphthyl)-butyl, and the like.

The term "alkenyl" as a group or part of a group, refers to an unsaturated hydrocarbyl group, which may be linear, or branched, comprising one or more carbon-carbon double bonds. When a subscript is used herein following a carbon atom, the subscript refers to the number of carbon atoms that the named group may contain. For example, the term "$C_{2-24}$alkenyl" refers to an unsaturated hydrocarbyl group, which may be linear, or branched comprising one or more carbon-carbon double bonds and comprising from 2 to 24 carbon atoms. For example, $C_{2-10}$alkenyl includes all linear, or branched alkenyl groups having 2 to 10 carbon atoms. For example, $C_{2-6}$alkenyl includes all linear, or branched alkenyl groups having 2 to 6 carbon atoms. Examples of alkenyl groups are ethenyl, 2-propenyl, 2-butenyl, 3-butenyl, 2-pentenyl and its isomers, 2-hexenyl and its isomers, 2,4-pentadienyl. and the like. Where alkenyl groups as defined herein are divalent groups having single bonds for attachment to two other groups, they are termed "alkenylene".

The term "alkynyl" by itself or as part of another substituent, refers to an unsaturated hydrocarbyl group, which may be linear, or branched, comprising one or more carbon-carbon triple bonds. When a subscript is used herein following a carbon atom, the subscript refers to the number of carbon atoms that the named group may contain. For example, the term "$C_{2-24}$alkynyl" refers to an unsaturated hydrocarbyl group, which may be linear, or branched comprising one or more carbon-carbon triple bonds and comprising from 2 to 24 carbon atoms. For example, $C_{2-10}$alkynyl includes all linear, or branched alkynyl groups having 2 to 10 carbon atoms. For example, $C_{2-6}$alkynyl includes all linear, or branched alkynyl groups having 2 to 6 carbon atoms. Non limiting examples of $C_{2-6}$alkynyl groups include ethynyl, 2-propynyl, 2-butynyl, 3-butynyl, 2-pentynyl and its chain isomers, 2-hexynyl and its chain isomers, and the like. Where alkynyl groups as defined herein are divalent groups having single bonds for attachment to two other groups, they are termed "alkynylene".

The term "halo" or "halogen" as a group or part of a group is generic for fluoro, chloro, bromo, and iodo, i.e. to F, Cl, Br, and I, more preferably to F, Cl, and Br, more preferably to Cl.

The term "ether" includes both mono and polyethers and refers to groups having a chain containing carbon and oxygen and each of these units preferably comprises 1 to 12 carbons for each oxygen atom. Examples are dimethyl, diethyl and dipropyl ethers, polyethyleneoxide, polyprolyleneoxide, polyethelene glycol, polybuteleneoxide.

The terms "heterocycloakyl" or "heterocyclyl" or "heterocyclo", as a group or part of a group, refer to non-aromatic, fully saturated or partially unsaturated cyclic groups (for example, 3 to 7 member monocyclic, 7 to 11 member bicyclic, or containing a total of 3 to 10 ring atoms) which have at least one heteroatom in at least one carbon atom-containing ring. Each ring of the heterocyclic group containing a heteroatom may have 1, 2, 3 or 4 heteroatoms selected from N, O and/or S, where the N and S heteroatoms may optionally be oxidized and the N heteroatoms may optionally be quaternized. The heterocyclic group may be attached at any heteroatom or carbon atom of the ring or ring system, where valence allows. The rings of multi-ring heterocycles may be fused, bridged and/or joined through one or more spiro atoms.

Non limiting exemplary heterocyclic groups include aziridinyl, oxiranyl, thiiranyl, piperidinyl, azetidinyl, 2-imidazolinyl, pyrazolidinyl, imidazolidinyl, isoxazolinyl, oxazolidinyl, isoxazolidinyl, thiazolidinyl, isothiazolidinyl, piperidinyl, succinimidyl, 3H-indolyl, indolinyl, isoindolinyl, 2H-pyrrolyl, 1-pyrrolinyl, 2-pyrrolinyl, 3-pyrrolinyl, pyrrolidinyl, 4H-quinolizinyl, 2-oxopiperazinyl, piperazinyl, homopiperazinyl, 2-pyrazolinyl, 3-pyrazolinyl, tetrahydro-2H-pyranyl, 2H-pyranyl, 4H-pyranyl, 3,4-dihydro-2H-pyranyl, oxetanyl, thietanyl, 1,4-dioxanyl, 2,5-dioximidazolidinyl, 2-oxopiperidinyl, 2-oxopyrrolodinyl, indolinyl, tetrahydropyranyl, tetrahydrofuranyl, tetrahydrothiophenyl, tetrahydroquinolinyl, tetrahydroisoquinolin-1-yl, tetrahydroisoquinolin-2-yl, tetrahydroisoquinolin-3-yl, tetrahydroisoquinolin-4-yl, thiomorpholin-4-yl, thiomorpholin-4-ylsulfoxide, thiomorpholin-4-ylsulfone, 1,3-dioxolanyl, 1,4-oxathianyl, 1,4-dithianyl, 1,3,5-trioxanyl, 1H-pyrrolizinyl, tetrahydro-1,1-dioxothiophenyl, N-formylpiperazinyl, and morpholin-4-yl.

The term "heteroaryl" as a group or part of a group, refers but is not limited to 5 to 12 atom aromatic rings, for example 5 to 12 atom aromatic rings, or ring systems containing 1 to 2 rings which are fused together or linked covalently, typically containing 5 to 6 atoms; at least one of which is aromatic in which one or more carbon atoms in one or more of these rings can be replaced by N, O and/or S atoms (thereby reducing the number of carbon atoms in the ring) where the N and S heteroatoms may optionally be oxidized and the N heteroatoms may optionally be quaternized. Such rings may be fused to an aryl, cycloalkyl, heteroaryl or heterocyclyl ring. Non-limiting examples of such heteroaryl, include: pyrrolyl, furanyl, thiophenyl, pyrazolyl, imidazolyl, oxazolyl, isoxazolyl, thiazolyl, isothiazolyl, triazolyl, oxadiazolyl, thiadiazolyl, tetrazolyl, oxatriazolyl, thiatriazolyl, pyridinyl, pyrimidyl, pyrazinyl, pyridazinyl, oxazinyl, dioxinyl, thiazinyl, triazinyl, imidazo[2,1-b][1,3]thiazolyl, thieno[3,2-b]furanyl, thieno[3,2-b]thiophenyl, thieno[2,3-d][1,3]thiazolyl, thieno[2,3-d]imidazolyl, tetrazolo[1,5-a]pyridinyl, indolyl, indolizinyl, isoindolyl, benzofuranyl, isobenzofuranyl, benzothiophenyl, isobenzothiophenyl, indazolyl, benzimidazolyl, 1,3-benzoxazolyl, 1,2-benzisoxazolyl, 2,1-benzisoxazolyl, 1,3-benzothiazolyl, 1,2-benzoisothiazolyl, 2,1-benzoisothiazolyl, benzotriazolyl, 1,2,3-benzoxadiazolyl, 2,1,3-benzoxadiazolyl, 1,2,3-benzothiadiazolyl, 2,1,3-benzothiadiazolyl, thienopyridinyl, purinyl, imidazo[1,2-a]pyridinyl, 6-oxo-pyridazin-1(6H)-yl, 2-oxopyridin-1(2H)-yl, 6-oxo-pyridazin-1(6H)-yl, 2-oxopyridin-1(2H)-yl, 1,3-benzodioxolyl, quinolinyl, isoquinolinyl, cinnolinyl, quinazolinyl, quinoxalinyl; preferably said heteroaryl group is selected from the group consisting of pyridyl, pyrazinyl, pyrazolyl, pyrrolyl, imidazolyl, benzimidazolyl, pyrimidinyl, triazolyl and thiazolyl.

The term "pyrrolyl" (also called azolyl) as used herein includes pyrrol-1-yl, pyrrol-2-yl and pyrrol-3-yl. The term "furanyl" (also called "furyl") as used herein includes furan-2-yl and furan-3-yl (also called furan-2-yl and furan-3-yl). The term "thiophenyl" (also called "thienyl") as used herein includes thiophen-2-yl and thiophen-3-yl (also called thien-2-yl and thien-3-yl). The term "pyrazolyl" (also called 1H-pyrazolyl and 1,2-diazolyl) as used herein includes pyrazol-1-yl, pyrazol-3-yl, pyrazol-4-yl and pyrazol-5-yl. The term "imidazolyl" as used herein includes imidazol-1-yl, imidazol-2-yl, imidazol-4-yl and imidazol-5-yl. The term "oxazolyl" (also called 1,3-oxazolyl) as used herein includes oxazol-2-yl; oxazol-4-yl and oxazol-5-yl. The term "isoxazolyl" (also called 1,2-oxazolyl), as used herein includes isoxazol-3-yl, isoxazol-4-yl, and isoxazol-5-yl. The term "thiazolyl" (also called 1,3-thiazolyl), as used herein includes thiazol-2-yl, thiazol-4-yl and thiazol-5-yl (also called 2-thiazolyl, 4-thiazolyl and 5-thiazolyl). The term "isothiazolyl" (also called 1,2-thiazolyl) as used herein includes isothiazol-3-yl, isothiazol-4-yl, and isothiazol-5-yl. The term "triazolyl" as used herein includes 1H-triazolyl and 4H-1,2,4-triazolyl, "1H-triazolyl" includes 1H-1,2,3-triazol-1-yl, 1H-1,2,3-triazol-4-yl, 1H-1,2,3-triazol-5-yl, 1H-1,2,4-triazol-1-yl, 1H-1,2,4-triazol-3-yl and 1H-1,2,4-triazol-5-yl. "4H-1,2,4-triazolyl" includes 4H-1,2,4-triazol-4-yl, and 4H-1,2,4-triazol-3-yl. The term "oxadiazolyl" as used herein includes 1,2,3-oxadiazol-4-yl, 1,2,3-oxadiazol-5-yl, 1,2,4-oxadiazol-3-yl, 1,2,4-oxadiazol-5-yl, 1,2,5-oxadiazol-3-yl and 1,3,4-oxadiazol-2-yl. The term "thiadiazolyl" as used herein includes 1,2,3-thiadiazol-4-yl, 1,2,3-thiadiazol-5-yl, 1,2,4-thiadiazol-3-yl, 1,2,4-thiadiazol-5-yl, 1,2,5-thiadiazol-3-yl (also called furazan-3-yl) and 1,3,4-thiadiazol-2-yl. The term "tetrazolyl" as used herein includes 1H-tetrazol-1-yl, 1H-tetrazol-5-yl, 2H-tetrazol-2-yl, and 2H-tetrazol-5-yl. The term "oxatriazolyl" as used herein includes 1,2,3,4-oxatriazol-5-yl and 1,2,3,5-oxatriazol-4-yl. The term "thiatriazolyl" as used herein includes 1,2,3,4-thiatriazol-5-yl and 1,2,3,5-thiatriazol-4-yl. The term "pyridinyl" (also called "pyridyl") as used herein includes pyridin-2-yl, pyridin-3-yl and pyridin-4-yl (also called 2-pyridyl, 3-pyridyl and 4-pyridyl). The term "pyrimidyl" as used herein includes pyrimid-2-yl, pyrimid-4-yl, pyrimid-5-yl and pyrimid-6-yl. The term "pyrazinyl" as used herein includes pyrazin-2-yl and pyrazin-3-yl. The term "pyridazinyl as used herein includes pyridazin-3-yl and pyridazin-4-yl. The term "oxazinyl" (also called "1,4-oxazinyl") as used herein includes 1,4-oxazin-4-yl and 1,4-oxazin-5-yl. The term "dioxinyl" (also called "1,4-dioxinyl") as used herein includes 1,4-dioxin-2-yl and 1,4-dioxin-3-yl. The term "thiazinyl" (also called "1,4-thiazinyl") as used herein includes 1,4-thiazin-2-yl, 1,4-thiazin-3-yl, 1,4-thiazin-4-yl, 1,4-thiazin-5-yl and 1,4-thiazin-6-yl. The term "triazinyl" as used herein includes 1,3,5-triazin-2-yl, 1,2,4-triazin-3-yl, 1,2,4-triazin-5-yl, 1,2,4-triazin-6-yl, 1,2,3-triazin-4-yl and 1,2,3-triazin-5-yl. The term "imidazo[2,1-b][1,3]thiazolyl" as used herein includes imidazo[2,1-b][1,3]thiazoi-2-yl, imidazo[2,1-b][1,3]thiazol-3-yl, imidazo[2,1-b][1,3]thiazol-5-yl and imidazo[2,1-b][1,3]thiazol-6-yl. The term "thieno[3,2-b]furanyl" as used herein includes thieno[3,2-b]furan-2-yl, thieno[3,2-b]furan-3-yl, thieno[3,2-b]furan-4-yl, and thieno[3,2-b]furan-5-yl. The term "thieno[3,2-b]thiophenyl" as used herein includes thieno[3,2-b]thien-2-yl, thieno[3,2-b]thien-3-yl, thieno[3,2-b]thien-5-yl and thieno[3,2-b]thien-6-yl. The term "thieno[2,3-d][1,3]thiazolyl" as used herein includes thieno[2,3-d][1,3]thiazol-2-yl, thieno[2,3-d][1,3]thiazol-5-yl and thieno[2,3-d][1,3]thiazol-6-yl. The term "thieno[2,3-d]imidazolyl" as used herein includes thieno[2,3-d]imidazol-2-yl, thieno[2,3-d]imidazol-4-yl and thieno[2,3-d]imidazol-5-yl. The term "tetrazolo[1,5-a]pyridinyl" as used herein includes tetrazolo[1,5-a]pyridine-5-yl, tetrazolo[1,5-a]pyridine-6-yl, tetrazolo[1,5-a]pyridine-7-yl, and tetrazolo[1,5-a]pyridine-8-yl. The term "indolyl" as used herein includes indol-1-yl, indol-2-yl, indol-3-yl, -indol-4-yl, indol-5-yl, indol-6-yl and indol-7-yl.

The term "indolizinyl" as used herein includes indolizin-1-yl, indolizin-2-yl, indolizin-3-yl, indolizin-5-yl, indolizin-6-yl, indolizin-7-yl, and indolizin-8-yl. The term "isoindolyl" as used herein includes isoindol-1-yl, isoindol-2-yl, isoindol-3-yl, isoindol-4-yl, isoindol-5-yl, isoindol-6-yl and isoindol-7-yl. The term "benzofuranyl" (also called benzo[b]furanyl) as used herein includes benzofuran-2-yl, benzofuran-3-yl, benzofuran-4-yl, benzofuran-5-yl, benzofuran-6-yl and benzofuran-7-yl. The term "isobenzofuranyl" (also called benzo[c]furanyl) as used herein includes isobenzofuran-1-yl, isobenzofuran-3-yl, isobenzofuran-4-yl, isobenzofuran-5-yl, isobenzofuran-6-yl and isobenzofuran-7-yl. The term "benzothiophenyl" (also called benzo[b]thienyl) as used herein includes 2-benzo[b]thiophenyl, 3-benzo[b]thiophenyl, 4-benzo[b]thiophenyl, 5-benzo[b]thiophenyl, 6-benzo[b]thiophenyl and -7-benzo[b]thiophenyl (also called benzothien-2-yl, benzothien-3-yl, benzothien-4-yl, benzothien-5-yl, benzothien-6-yl and benzothien-7-yl). The term "isobenzothiophenyl" (also called benzo[c]thienyl) as used herein includes isobenzothien-1-yl, isobenzothien-3-yl, isobenzothien-4-yl, isobenzothien-5-yl, isobenzothien-6-yl and isobenzothien-7-yl. The term "indazolyl" (also called 1H-indazolyl or 2-azaindolyl) as used herein includes 1H-indazol-1-yl, 1H-indazol-3-yl, 1H-indazol-4-yl, 1H-indazol-5-yl, 1H-indazol-6-yl, 1H-indazol-7-yl, 2H-indazol-2-yl, 2H-indazol-3-yl, 2H-indazol-4-yl, 2H-indazol-5-yl, 2H-indazol-6-yl, and 2H-indazol-7-yl. The term "benzimidazolyl" as used herein includes benzimidazol-1-yl, benzimidazol-2-yl, benzimidazol-4-yl, benzimidazol-5-yl, benzimidazol-6-yl and benzimidazol-7-yl. The term "1,3-benzoxazolyl" as used herein includes 1,3-benzoxazol-2-yl, 1,3-benzoxazol-4-yl, 1,3-benzoxazol-5-yl, 1,3-benzoxazol-6-yl and 1,3-benzoxazol-7-yl. The term "1,2-benzisoxazolyl" as used herein includes 1,2-benzisoxazol-3-yl, 1,2-benzisoxazol-4-yl, 1,2-benzisoxazol-5-yl, 1,2-benzisoxazol-6-yl and 1,2-benzisoxazol-7-yl. The term "2,1-benzisoxazolyl" as used herein includes 2,1-benzisoxazol-3-yl, 2,1-benzisoxazol-4-yl, 2,1-benzisoxazol-5-yl, 2,1-benzisoxazol-6-yl and 2,1-benzisoxazol-7-yl. The term "1,3-benzothiazolyl" as used herein includes 1,3-benzothiazol-2-yl, 1,3-benzothiazol-4-yl, 1,3-benzothiazol-5-yl, 1,3-benzothiazol-6-yl and 1,3-benzothiazol-7-yl. The term "1,2-benzoisothiazolyl" as used herein includes 1,2-benzisothiazol-3-yl, 1,2-benzisothiazol-4-yl, 1,2-benzisothiazol-5-yl, 1,2-benzisothiazol-6-yl and 1,2-benzisothiazol-7-yl. The term "2,1-benzoisothiazolyl" as used herein includes 2,1-benzisothiazol-3-yl, 2,1-benzisothiazol-4-yl, 2,1-benzisothiazol-5-yl, 2,1-benzisothiazol-6-yl and 2,1-benzisothiazol-7-yl. The term "benzotriazolyl" as used herein includes benzotriazol-1-yl, benzotriazol-4-yl, benzotriazol-5-yl, benzotriazol-6-yl and benzotriazol-7-yl. The term "1,2,3-benzoxadiazolyl" as used herein includes 1,2,3-benzoxadiazol-4-yl, 1,2,3-benzoxadiazol-5-yl, 1,2,3-benzoxadiazol-6-yl and 1,2,3-benzoxadiazol-7-yl. The term "2,1,3-benzoxadiazolyl" as used herein includes 2,1,3-benzoxadiazol-4-yl, 2,1,3-benzoxadiazol-5-yl, 2,1,3-benzoxadiazol-6-yl and 2,1,3-benzoxadiazol-7-yl. The term "1,2,3-benzothiadiazolyl" as used herein includes 1,2,3-benzothiadiazol-4-yl, 1,2,3-benzothiadiazol-5-yl, 1,2,3-benzothiadiazol-6-yl and 1,2,3-benzothiadiazol-7-yl. The term "2,1,3-benzothiadiazolyl" as used herein includes 2,1,3-benzothiadiazol-4-yl, 2,1,3-benzothiadiazol-5-yl, 2,1,3-benzothiadiazol-6-yl and 2,1,3-benzothiadiazol-7-yl. The term "thienopyridinyl" as used herein includes thieno[2,3-b]pyridinyl, thieno[2,3-c]pyridinyl, thieno[3,2-c]pyridinyl and thieno[3,2-b]pyridinyl. The term "purinyl" as used herein includes purin-2-yl, purin-6-yl, purin-7-yl and purin-8-yl. The term "imidazo[1,2-a]pyridinyl", as used herein includes imidazo[1,2-a]pyridin-2-yl, imidazo[1,2-a]pyridin-3-yl, imidazo[1,2-a]pyridin-4-yl, imidazo[1,2-a]pyridin-5-yl, imidazo[1,2-a]pyridin-6-yl and imidazo[1,2-a]pyridin-7-yl. The term "1,3-benzodioxolyl", as used herein includes 1,3-benzodioxol-4-yl, 1,3-benzodioxol-5-yl, 1,3-benzodioxol-6-yl, and 1,3-benzodioxol-7-yl. The term "quinolinyl" as used herein includes quinolin-2-yl, quinolin-3-yl, quinolin-4-yl, quinolin-5-yl, quinolin-6-yl, quinolin-7-yl and quinolin-8-yl. The term "isoquinolinyl" as used herein includes isoquinolin-1-yl, isoquinolin-3-yl, isoquinolin-4-yl, isoquinolin-5-yl, isoquinolin-6-yl, isoquinolin-7-yl and isoquinolin-8-yl. The term "cinnolinyl" as used herein includes cinnolin-3-yl, cinnolin-4-yl, cinnolin-5-yl, cinnolin-6-yl, cinnolin-7-yl and cinnolin-8-yl. The term "quinazolinyl" as used herein includes quinazolin-2-yl, quinazolin-4-yl, quinazolin-5-yl, quinazolin-6-yl, quinazolin-7-yl and quinazolin-8-yl. The term "quinoxalinyl". as used herein includes quinoxalin-2-yl, quinoxalin-5-yl, and quinoxalin-6-yl.

The term "heteroalkyl$C_{1-12}$alkyl", as a group or part of a group, means a $C_{1-12}$alkyl as defined herein, wherein at least one hydrogen atom is replaced by at least one heteroaryl as defined herein.

The terms described above and others used in the specification are well understood to those in the art.

Preferred statements (features), and embodiments of the compositions of this invention are now set forth, Each statement and embodiment of the invention so defined may be combined with any other statement and/or embodiments unless clearly indicated to the contrary. In particular, any feature indicated as being preferred or advantageous may be combined with any other feature or features indicated as being preferred or advantageous.

Preferred statements (features) and embodiments of this invention are set herein below. Each statements and embodiments of the invention so defined may be combined with any other statement and/or embodiments unless clearly indicated to the contrary. In particular, any feature indicated as being preferred or advantageous may be combined with any other feature or features or statements indicated as being preferred or advantageous. Hereto, the present invention is in particular captured by any one or any combination of one or more of the below numbered aspects and embodiments 1 to 76, with any other statement and/or embodiments.

1. A coating composition comprising an oxidatively drying binder and an anti-skinning agent, the anti-skinning agent comprising:
   a) a diketone of formula I

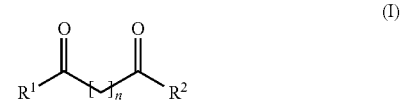

wherein
   n is an integer selected from 1 and 2, preferably wherein n is 1; and
   $R^1$ is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen;
   $R^2$ is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; or $R^1$ taken together with $R^2$ form a 4, 5, 6, 7, 8, 9 or 10-membered carbon ring, optionally substituted with one or more substituents each independently selected from the group comprising $C_{1-6}$alkyl, —OH, and halogen; and b) an aldoxime or ketoxime of formula II

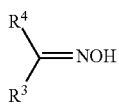

wherein $R^3$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen;

$R^4$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; or $R^3$ and $R^4$ are each $C_{1-5}$alkylene and are connected to form a cyclic group, optionally substituted with one or more substituents each independently selected from the group comprising $C_{1-6}$alkyl, —OH, and halogen.

2. Use of a composition comprising:

a) a diketone of formula I

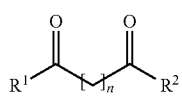

wherein n is an integer selected from 1 and 2, preferably wherein n is 1; and $R^1$ is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen;

$R^2$ is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; or $R^1$ taken together with $R^2$ form a 4, 5, 6, 7, 8, 9 or 10-membered carbon ring, optionally substituted with one or more substituents each independently selected from the group comprising $C_{1-6}$alkyl, —OH, and halogen; and b) an aldoxime or ketoxime of formula II

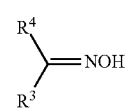

wherein $R^3$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen;

$R^4$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; or $R^3$ and $R^4$ are each $C_{1-5}$alkylene and are connected to form a cyclic group, optionally substituted with one or more substituents each independently selected from the group comprising $C_{1-6}$alkyl, —OH, and halogen;

as an anti-skinning agent in a coating composition comprising an oxidatively drying binder.

3. The coating composition or use according to any one of statements 1 or 2, wherein the coating composition further comprising at least one metal complex comprising at least one metal, wherein the at least one metal is selected from the group comprising cobalt (Co), manganese (Mn), iron (Fe), vanadium (V), cerium (Ce), copper (Cu), lead (Pb), calcium (Ca), zirconium (Zr), lanthanum (La), neodymium (Nd), bismuth (Bi), strontium (Sr), zinc (Zn), lithium (Li), potassium (K), and barium (Ba), preferably wherein the at least one metal is selected from the group comprising cobalt (Co), manganese (Mn), iron (Fe), vanadium (V), cerium (Ce), copper (Cu), and lead (Pb).

4. The coating composition or use according to any one of statements 1 to 3, wherein the coating composition further comprising at least one metal complex comprising at least one metal, wherein the at least one metal is selected from the group comprising cobalt (Co), calcium (Ca), and zirconium (Zr).

5. The coating composition or use according to any one of statements 3 to 4, wherein the metal complex is a metal salt of an organic acid.

6. The coating composition or use according to any one of statements 3 to 5, wherein the metal complex is a cobalt (Co) salt of an organic acid, a calcium (Ca) salt of an organic acid, or a zirconium (Zr) salt of an organic acid 7. The coating composition or use according to any one of statements 1 to 6, wherein the diketone of formula (I) is present in said composition in an amount of at least 0.3% by weight, with % by weight based on the total weight of the coating composition, for example of at least 0.4% by weight, with % by weight based on the total weight of the coating composition, preferably wherein the diketone of formula (I) is present in said composition in an amount of at least 0.5% by weight, with % by weight based on the total weight of the coating composition, for example at least 0.6% by weight, for example at least 0.7% by weight, for example at least 0.8% by weight, with % by weight based on the total weight of the coating composition, for example at least 0.9% by weight.

8. The coating composition or use according to any one of statements 1 to 7, wherein the diketone of formula (I) is present in said composition in an amount of at least 1.0% by weight, with % by weight based on the total weight of the coating composition, for example at least 1.2% by weight, for example at least 1.4% by weight, for example at least 1.6% by weight, for example at least 1.8% by weight, for example at least 2.0% by weight.

9. The coating composition or use according to any one of statements 1 to 7, wherein the diketone of formula (I) is present in said composition in an amount of at most 5.0% by weight, with % by weight based on the total weight of the coating composition, for example at most 4.5% by weight, for example at most 4.0% by weight, for example at most 3.5% by weight, for example at most 3.0% by weight.

10. The coating composition or use according to any one of statements 1 to 9, wherein the aldoxime or ketoxime of formula (II) is present in said composition in an amount of least 0.01% by weight, with % by weight based on the total weight of the coating composition, for example at least 0.02% by weight, for example at least 0.03% by weight, for example at least 0.04% by weight, for example at least 0.05% by weight, for example at least 0.06% by weight, for example at least 0.07% by weight, for example at least 0.08% by weight, for example at least 0.09% by weight.

11. The coating composition or use according to any one of statements 1 to 10, wherein the aldoxime or ketoxime of formula (II) is present in said composition in an amount of at most 1.0% by weight, with % by weight based on the total weight of the coating composition, for example at most 0.80% by weight, for example at most 0.60% by weight, for example at most 0.40% by weight.

12. The coating composition or use according to any one of statements 1 to 11, wherein the aldoxime or ketoxime of formula (II) is present in said composition in an amount of at most 0.30% by weight, with % by weight based on the total weight of the coating composition.

13. The coating composition or use according to any one of statements 1 to 12, wherein the aldoxime or ketoxime of formula (II) is present in said composition in an amount of at most 0.20% by weight, with % by weight based on the total weight of the coating composition, for example at most 0.18% by weight, for example at most 0.16% by weight, for example at most 0.14% by weight, for example at most 0.11% by weight, for example at most 0.10% by weight.

14. The coating composition or use according to any one of statements 1 to 13, wherein the diketone of formula (I) is present in said composition in an amount of at least 0.3% by weight, with % by weight based on the total weight of the coating composition, for example of at least 0.4% by weight, with % by weight based on the total weight of the coating composition, preferably wherein the diketone of formula (I) is present in said composition in an amount of at least 0.5% by weight, with % by weight based on the total weight of the coating composition, for example at least 0.6% by weight, for example at least 0.7% by weight, for example at least 0.8% by weight, with % by weight based on the total weight of the coating composition, for example at least 0.9% by weight; and wherein the aldoxime or ketoxime of formula (II) is present in said composition in an amount of at most 1.0% by weight, with % by weight based on the total weight of the coating composition, for example at most 0.80% by weight, for example at most 0.60% by weight, for example at most 0.40% by weight.

15. The coating composition or use according to any one of statements 1 to 14, wherein the diketone of formula (I) is present in said composition in an amount of at least 0.3% by weight, with % by weight based on the total weight of the coating composition, for example of at least 0.4% by weight, with % by weight based on the total weight of the coating composition, preferably wherein the diketone of formula (I) is present in said composition in an amount of at least 0.5% by weight, with % by weight based on the total weight of the coating composition, for example at least 0.6% by weight, for example at least 0.7% by weight, for example at least 0.8% by weight, with % by weight based on the total weight of the coating composition, for example at least 0.9% by weight; and wherein the aldoxime or ketoxime of formula (II) is present in said composition in an amount of at most 0.30% by weight, with % by weight based on the total weight of the coating composition.

16. The coating composition or use according to any one of statements 1 to 15, wherein the diketone of formula (I) is present in said composition in an amount of at least 0.3% by weight, with % by weight based on the total weight of the coating composition, for example of at least 0.4% by weight, with % by weight based on the total weight of the coating composition, preferably wherein the diketone of formula (I) is present in said composition in an amount of at least 0.5% by weight, with % by weight based on the total weight of the coating composition, for example at least 0.6% by weight, for example at least 0.7% by weight, for example at least 0.8% by weight, with % by weight based on the total weight of the coating composition, for example at least 0.9% by weight; and the aldoxime or ketoxime of formula (II) is present in said composition in an amount of at most 0.20% by weight, with % by weight based on the total weight of the coating composition, for example at most 0.18% by weight, for example at most 0.16% by weight, for example at most 0.14% by weight, for example at most 0.11% by weight, for example at most 0.10% by weight.

17. The coating composition or use according to any one of statements 1 to 16, wherein the diketone of formula (I) is present in said composition in an amount of at least 1.0% by weight, with % by weight based on the total weight of the coating composition, for example at least 1.2% by weight, for example at least 1.4% by weight, for example at least 1.6% by weight, for example at least 1.8% by weight, for example at least 2.0% by weight; and wherein the aldoxime or ketoxime of formula (II) is present in said composition in an amount of at most 0.40% by weight, with % by weight based on the total weight of the coating composition.

18. The coating composition or use according to any one of statements 1 to 17, wherein the diketone of formula (I) is present in said composition in an amount of at least 1.0% by weight, with % by weight based on the total weight of the coating composition, for example at least 1.2% by weight, for example at least 1.4% by weight, for example at least 1.6% by weight, for example at least 1.8% by weight, for example at least 2.0% by weight; and wherein the aldoxime or ketoxime of formula (II) is present in said composition in an amount of in at most 0.30% by weight, with % by weight based on the total weight of the coating composition.

19. The coating composition or use according to any one of statements 1 to 18, wherein the diketone of formula (I) is present in at least 1.0% by weight, with % by weight based on the total weight of the coating composition, for example at least 1.2% by weight, for example at least 1.4% by weight, for example at least 1.6% by weight, for example at least 1.8% by weight, for example at least 2.0% by weight; and wherein the aldoxime or ketoxime of formula (II) is present in said composition in an amount of at most 0.20% by weight, with % by weight based on the total weight of the coating composition, for example at most 0.18% by weight, for example at most 0.16% by weight, for example at most 0.14% by weight, for example at most 0.11% by weight, for example at most 0.10% by weight.

20. The coating composition or use according to any one of statements 1 to 19, comprising at most 0.40% by weight of methyl ethyl ketoxime, with % by weight based on the total weight of the coating composition, preferably at most 0.30% by weight, preferably at most 0.20% by weight, for example at most 0.18% by weight, for example at most 0.16% by weight, for example at most 0.14% by weight, for example at most 0.11% by weight, for example at most 0.10% by weight.

21. The coating composition or use according to any one of statements 1 to 20, wherein $R^1$ is $C_{1-24}$alkyl, optionally substituted with one or more substituents each independently selected from the group comprising $C_{1-6}$alkyl, —OH, and halogen.

22. The coating composition or use according to any one of statements 1 to 21, wherein $R^2$ is $C_{1-24}$alkyl, optionally substituted with one or more substituents each independently selected from the group comprising $C_{1-6}$alkyl, —OH, and halogen.

23. The coating composition or use according to any one of statements 1 to 22, wherein $R^1$ is $C_{1-6}$alkyl, optionally substituted with one or more substituents each independently selected from the group comprising $C_{1-6}$alkyl, —OH, and halogen.

24. The coating composition or use according to any one of statements 1 to 23, wherein $R^2$ is $C_{1-6}$alkyl, optionally substituted with one or more substituents each independently selected from the group comprising $C_{1-6}$alkyl, —OH, and halogen.

25. The coating composition or use according to any one of statements 1 to 24, wherein $R^1$ is $C_{1-6}$alkyl; and $R^2$ is $C_{1-6}$alkyl.

26. The coating composition or use according to any one of statements 1 to 25, wherein $R^1$ and $R^2$ are each independently selected from unsubstituted $C_{1-24}$alkyl, preferably from $C_{1-6}$alkyl, preferably from $C_{1-3}$alkyl, preferably from methyl and ethyl.

27. The coating composition or use according to any one of statements 1 to 26, wherein $R^1$ is methyl and $R^2$ is methyl.

28. The coating composition or use according to any one of statements 1 to 20, wherein $R^1$ taken together with $R^2$ form a 5, 6, 7, 8-membered carbon ring, optionally substituted with one or more substituents each independently selected from the group comprising $C_{1-6}$alkyl, —OH, and halogen.

29. The coating composition or use according to any one of statements 1 to 20, wherein $R^1$ taken together with $R^2$ form a 5, 6, or 7-membered carbon ring, optionally substituted with one or more substituents each independently selected from the group comprising $C_{1-6}$alkyl, —OH, and halogen.

30. The coating composition or use according to any one of statements 1 to 20, wherein $R^1$ taken together with $R^2$ form a 5 or 6-membered carbon ring, optionally substituted with one or more substituents each independently selected from the group comprising $C_{1-6}$alkyl, —OH, and halogen.

31. The coating composition or use according to any one of statements 1 to 30, wherein n is 1.

32. The coating composition or use according to any one of statements 1 to 20, 31, wherein $R^1$ and $R^2$ are each independently selected from unsubstituted $C_{1-24}$alkyl, preferably from $C_{1-6}$alkyl, preferably from $C_{1-3}$alkyl, preferably from methyl and ethyl; and n=1.

33. The coating composition or use according to any one of statements 1 to 20, 31, 32, wherein $R^1$ is methyl, $R^2$ is methyl; and n is 1.

34. The coating composition or use according to any one of statements 1 to 33, wherein $R^3$ is selected from the group comprising hydrogen, $C_{1-24}$alkyl, $C_{6-20}$aryl, heteroaryl, each group being optionally substituted with one or more substituents each independently selected from the group comprising $C_{1-6}$alkyl, —OH, and halogen.

35. The coating composition or use according to any one of statements 1 to 34, wherein $R^4$ is selected from the group comprising hydrogen, $C_{1-24}$alkyl, $C_{6-20}$aryl, heteroaryl, each group being optionally substituted with one or more substituents each independently selected from the group comprising $C_{1-6}$alkyl, —OH, and halogen.

36. The coating composition or use according to any one of statements 1 to 35, wherein $R^3$ is selected from the group comprising hydrogen, $C_{1-10}$alkyl, $C_{6-12}$aryl, heteroaryl, each group being optionally substituted with one or more substituents each independently selected from the group comprising $C_{1-6}$alkyl, —OH, and halogen.

37. The coating composition or use according to any one of statements 1 to 36, wherein $R^4$ is selected from the group comprising hydrogen, $C_{1-10}$alkyl, $C_{6-10}$aryl, heteroaryl, each group being optionally substituted with one or more substituents each independently selected from the group comprising $C_{1-6}$alkyl, —OH, and halogen.

38. The coating composition or use according to any one of statements 1 to 37, wherein $R^3$ is hydrogen, or $C_{1-10}$alkyl, optionally substituted with one or more substituents each independently selected from the group comprising $C_{1-6}$alkyl, —OH, and halogen; and $R^4$ is hydrogen, or $C_{1-10}$alkyl, optionally substituted with one or more substituents each independently selected from the group comprising $C_{1-6}$alkyl, —OH, and halogen.

39. The coating composition or use according to any one of statements 1 to 38, wherein $R^3$ is hydrogen, or $C_{1-6}$alkyl, optionally substituted with one or more substituents each independently selected from the group comprising $C_{1-6}$alkyl, —OH, and halogen; and $R^4$ is hydrogen, or $C_{1-6}$alkyl, optionally substituted with one or more substituents each independently selected from the group comprising $C_{1-6}$alkyl, —OH, and halogen.

40. The coating composition or use according to any one of statements 1 to 39, wherein $R^3$ is hydrogen, or $C_{1-6}$alkyl; and $R^4$ is hydrogen, or $C_{1-6}$alkyl, preferably $C_{1-6}$alkyl.

41. The coating composition or use according to any one of statements 1 to 40, wherein the aldoxime or ketoxime of formula (II) is selected from the group comprising methyl ethyl ketoxime, dimethyl ketoxime, cyclohexanone oxime, methyl isobutyl ketoxime, formaldehyde oxime, acetaldehyde oxime, propionaldehyde oxime, butyraldehyde oxime, isobutyraldehyde oxime, pentan-2-one oxime, pentan-3-one oxime, cyclopentanone oxime, 3-methylbutyraldehyde oxime, hexan-2-one oxime, heptanal oxime, heptan-2-one oxime, heptan-3-one oxime, heptan-4-one oxime, 2,4-dimethylpentan-3-one oxime, 5-methylhexan-2-one oxime, benzaldehyde oxime, salicylaldoxime, acetophenone oxime, benzophenone oxime, 3-pyridinealdoxime, and 4-pyridinealdoxime.

42. The coating composition or use according to any one of statements 1 to 41, wherein the ketoxime of formula (II) is selected from the group comprising methyl ethyl ketoxime, dimethyl ketoxime, cyclohexanone oxime, and methyl isobutyl ketoxime.

43. The coating composition or use according to any one of statements 1 to 42, wherein the ketoxime of formula (II) is methyl ethyl ketoxime.

44. The coating composition or use according to any one of statements 1 to 42, wherein the aldoxime or ketoxime of formula (II) is dimethyl ketoxime.

45. The coating composition or use according to any one of statements 1 to 44, wherein $R^1$ and $R^2$ are each independently selected from $C_{1-24}$alkyl, optionally substituted with one or more substituents each independently selected from the group comprising $C_{1-6}$alkyl, —OH, and halogen; and wherein the aldoxime or ketoxime of formula (II) is selected from the group comprising methyl ethyl ketoxime, dimethyl ketoxime, cyclohexanone oxime, methyl isobutyl ketoxime, formaldehyde oxime, acetaldehyde oxime, propionaldehyde oxime, butyraldehyde oxime, isobutyraldehyde oxime, pentan-2-one oxime, pentan-3-one oxime, cyclopentanone oxime, 3-methylbutyraldehyde oxime, hexan-2-one oxime, heptanal oxime, heptan-2-one oxime, heptan-3-one oxime, heptan-4-one oxime, 2,4-dimethylpentan-3-one oxime, 5-methylhexan-2-one oxime, benzaldehyde oxime, salicylaldoxime, acetophenone oxime, benzophenone oxime, 3-pyridinealdoxime, and 4-pyridinealdoxime.

46. The coating composition or use according to any one of statements 1 to 45, wherein $R^1$ and $R^2$ are each independently $C_{1-6}$alkyl, optionally substituted with one or more substituents each independently selected from the group comprising $C_{1-6}$alkyl, —OH, and halogen; and the aldoxime or ketoxime of formula (II) is selected from the group comprising methyl ethyl ketoxime, dimethyl ketoxime, cyclohexanone oxime, methyl isobutyl ketoxime, formaldehyde oxime, acetaldehyde oxime, propionaldehyde oxime, butyraldehyde oxime, isobutyraldehyde oxime, pentan-2-one oxime, pentan-3-one oxime, cyclopentanone oxime, 3-methylbutyraldehyde oxime, hexan-2-one oxime, heptanal oxime, heptan-2-one oxime, heptan-3-one oxime, heptan-4-one oxime, 2,4-dimethylpentan-3-one oxime, 5-methylhexan-2-one oxime, benzaldehyde oxime, salicylaldoxime, acetophenone oxime, benzophenone oxime, 3-pyridinealdoxime, and 4-pyridinealdoxime.

47. The coating composition or use according to any one of statements 1 to 46, wherein $R^1$ and $R^2$ are each independently $C_{1-6}$alkyl, preferably from $C_{1-4}$alkyl, preferably from methyl or ethyl; and the aldoxime or ketoxime of formula (II) is selected from the group comprising methyl ethyl ketoxime, dimethyl ketoxime, cyclohexanone oxime, methyl isobutyl ketoxime, formaldehyde oxime, acetaldehyde oxime, propionaldehyde oxime, butyraldehyde oxime, isobutyraldehyde oxime, pentan-2-one oxime, pentan-3-one oxime, cyclopentanone oxime, 3-methylbutyraldehyde oxime, hexan-2-one oxime, heptanal oxime, heptan-2-one oxime, heptan-3-one oxime, heptan-4-one oxime, 2,4-dimethylpentan-3-one oxime, 5-methylhexan-2-one oxime, benzaldehyde oxime, salicylaldoxime, acetophenone oxime, benzophenone oxime, 3-pyridinealdoxime, and 4-pyridinealdoxime.

48. The coating composition or use according to any one of statements 1 to 47, wherein $R^1$ is methyl and $R^2$ is methyl; and the aldoxime or ketoxime of formula (II) is selected from the group comprising methyl ethyl ketoxime, dimethyl ketoxime, cyclohexanone oxime, methyl isobutyl ketoxime, formaldehyde oxime, acetaldehyde oxime, propionaldehyde oxime, butyraldehyde oxime, isobutyraldehyde oxime, pentan-2-one oxime, pentan-3-one oxime, cyclopentanone oxime, 3-methylbutyraldehyde oxime, hexan-2-one oxime, heptanal oxime, heptan-2-one oxime, heptan-3-one oxime, heptan-4-one oxime, 2,4-dimethylpentan-3-one oxime, 5-methylhexan-2-one oxime, benzaldehyde oxime, salicylaldoxime, acetophenone oxime, benzophenone oxime, 3-pyridinealdoxime, and 4-pyridinealdoxime.

49. The coating composition or use according to any one of statements 1 to 48, wherein n is 1; and the aldoxime or ketoxime of formula (II) is selected from the group comprising methyl ethyl ketoxime, dimethyl ketoxime, cyclohexanone oxime, methyl isobutyl ketoxime, formaldehyde oxime, acetaldehyde oxime, propionaldehyde oxime, butyraldehyde oxime, isobutyraldehyde oxime, pentan-2-one oxime, pentan-3-one oxime, cyclopentanone oxime, 3-methylbutyraldehyde oxime, hexan-2-one oxime, heptanal oxime, heptan-2-one oxime, heptan-3-one oxime, heptan-4-one oxime, 2,4-dimethylpentan-3-one oxime, 5-methylhexan-2-one oxime, benzaldehyde oxime, salicylaldoxime, acetophenone oxime, benzophenone oxime, 3-pyridinealdoxime, and 4-pyridinealdoxime.

50. The coating composition or use according to any one of statements 1 to 49, wherein the diketone of formula (I) is 2,4-pentanedione ($R^1$ is methyl, $R^2$ is methyl; n is 1); and the aldoxime or ketoxime of formula (II) is selected from the group comprising methyl ethyl ketoxime, dimethyl ketoxime, cyclohexanone oxime, methyl isobutyl ketoxime, formaldehyde oxime, acetaldehyde oxime, propionaldehyde oxime, butyraldehyde oxime, isobutyraldehyde oxime, pentan-2-one oxime, pentan-3-one oxime, cyclopentanone oxime, 3-methylbutyraldehyde oxime, hexan-2-one oxime, heptanal oxime, heptan-2-one oxime, heptan-3-one oxime, heptan-4-one oxime, 2,4-dimethylpentan-3-one oxime, 5-methylhexan-2-one oxime, benzaldehyde oxime, salicylaldoxime, acetophenone oxime, benzophenone oxime, 3-pyridinealdoxime, and 4-pyridinealdoxime.

51. The coating composition or use according to any one of statements 1 to 50, wherein $R^1$ is methyl, $R^2$ is methyl; and the ketoxime of formula (II) is selected from the group comprising methyl ethyl ketoxime, dimethyl ketoxime, cyclohexanone oxime, and methyl isobutyl ketoxime, preferably from the group comprising methyl ethyl ketoxime, and dimethyl ketoxime.

52. The coating composition or use according to any one of statements 1 to 51, wherein n is 1; and the ketoxime of formula (II) is selected from the group comprising methyl ethyl ketoxime, dimethyl ketoxime, cyclohexanone oxime, and methyl isobutyl ketoxime, preferably from the group comprising methyl ethyl ketoxime, and dimethyl ketoxime.

53. The coating composition or use according to any one of statements 1 to 52, wherein the diketone of formula (I) is 2,4-pentanedione; and the ketoxime of formula (II) is selected from the group comprising methyl ethyl ketoxime, dimethyl ketoxime, cyclohexanone oxime, and methyl isobutyl ketoxime, preferably from the group comprising methyl ethyl ketoxime, and dimethyl ketoxime.
54. The coating composition or use according to any one of statements 1 to 53, wherein $R^1$ is methyl, $R^2$ is methyl; and the ketoxime of formula (II) is selected from the group comprising methyl ethyl ketoxime, and dimethyl ketoxime.
55. The coating composition or use according to any one of statements 1 to 54, wherein n is 1; and the ketoxime of formula (II) is selected from the group comprising methyl ethyl ketoxime, and dimethyl ketoxime.
56. The coating composition or use according to any one of statements 1 to 55, wherein the diketone of formula (I) is 2,4-pentanedione; and the ketoxime of formula (II) is selected from the group comprising methyl ethyl ketoxime, and dimethyl ketoxime.
57. The coating composition or use according to any one of statements 1 to 56, wherein the diketone of formula (I) is present in at least 0.5% by weight, with % by weight based on the total weight of the coating composition, preferably at least 0.6% by weight, preferably at least 0.7% by weight, preferably at least 0.8% by weight, with % by weight based on the total weight of the coating composition, preferably at least 0.9% by weight; and $R^1$ and $R^2$ are each independently selected from $C_{1-24}$alkyl, optionally substituted with one or more substituents each independently selected from the group comprising $C_{1-6}$alkyl, —OH, and halogen.
58. The coating composition or use according to any one of statements 1 to 57, wherein the diketone of formula (I) is present in at least 0.9% by weight, with % by weight based on the total weight of the coating composition, for example at least 1.2% by weight, for example at least 1.4% by weight, for example at least 1.6% by weight, for example at least 1.8% by weight, for example at least 2.0% by weight; and $R^1$ and $R^2$ are each independently selected from $C_{1-24}$alkyl, optionally substituted with one or more substituents each independently selected from the group comprising $C_{1-6}$alkyl, —OH, and halogen.
59. The coating composition or use according to any one of statements 1 to 58, wherein the diketone of formula (I) is present in at least 0.5% by weight, with % by weight based on the total weight of the coating composition, preferably at least 0.6% by weight, preferably at least 0.7% by weight, preferably at least 0.8% by weight, with % by weight based on the total weight of the coating composition, preferably at least 0.9% by weight; and $R^1$ and $R^2$ are each independently selected from unsubstituted $C_{1-24}$alkyl, preferably from $C_{1-6}$alkyl, preferably from $C_{1-3}$alkyl, preferably from methyl and ethyl.
60. The coating composition or use according to any one of statements 1 to 59, wherein the diketone of formula (I) is present in at least 0.9% by weight, with % by weight based on the total weight of the coating composition, for example at least 1.2% by weight, for example at least 1.4% by weight, for example at least 1.6% by weight, for example at least 1.8% by weight, for example at least 2.0% by weight; and $R^1$ and $R^2$ are each independently selected from unsubstituted $C_{1-24}$alkyl, preferably from $C_{1-6}$alkyl, preferably from $C_{1-3}$alkyl, preferably from methyl and ethyl, most preferably methyl.
61. The coating composition or use according to any one of statements 1 to 60, wherein the diketone of formula (I) is present in at least 0.5% by weight, with % by weight based on the total weight of the coating composition, preferably at least 0.6% by weight, preferably at least 0.7% by weight, preferably at least 0.8% by weight, with % by weight based on the total weight of the coating composition, preferably at least 0.9% by weight; and wherein n is 1.
62. The coating composition or use according to any one of statements 1 to 61, wherein the diketone of formula (I) is present in at least 0.9% by weight, with % by weight based on the total weight of the coating composition, for example at least 1.2% by weight, for example at least 1.4% by weight, for example at least 1.6% by weight, for example at least 1.8% by weight, for example at least 2.0% by weight; and wherein n is 1.
63. The coating composition or use according to any one of statements 1 to 62, wherein the aldoxime or ketoxime of formula (II) is present in said composition in an amount of at most 0.40% by weight, with % by weight based on the total weight of the coating composition; preferably at most 0.30% by weight, for example at most 0.20% by weight, for example at most 0.18% by weight, for example at most 0.16% by weight, for example at most 0.14% by weight, for example at most 0.11% by weight, for example at most 0.10% by weight; and $R^3$ is selected from the group comprising hydrogen, and $C_{1-24}$alkyl, optionally substituted with one or more substituents each independently selected from the group comprising $C_{1-6}$alkyl, —OH, and halogen; and $R^4$ is selected from the group comprising hydrogen, and $C_{1-24}$alkyl, optionally substituted with one or more substituents each independently selected from the group comprising $C_{1-6}$alkyl, —OH, and halogen.
64. The coating composition or use according to any one of statements 1 to 63, wherein the aldoxime or ketoxime of formula (II) is present in said composition in an amount of at most 0.40% by weight, with % by weight based on the total weight of the coating composition; and wherein the aldoxime or ketoxime of formula (II) is selected from the group comprising methyl ethyl ketoxime, dimethyl ketoxime, cyclohexanone oxime, methyl isobutyl ketoxime, formaldehyde oxime, acetaldehyde oxime, propionaldehyde oxime, butyraldehyde oxime, isobutyraldehyde oxime, pentan-2-one oxime, pentan-3-one oxime, cyclopentanone oxime, 3-methylbutyraldehyde oxime, hexan-2-one oxime, heptanal oxime, heptan-2-one oxime, heptan-3-one oxime, heptan-4-one oxime, 2,4-dimethylpentan-3-one oxime, 5-methylhexan-2-one oxime, benzaldehyde oxime, salicylaldoxime, acetophenone oxime, benzophenone oxime, 3-pyridinealdoxime, and 4-pyridinealdoxime.
65. The coating composition or use according to any one of statements 1 to 64, wherein the aldoxime or ketoxime of formula (II) is present in said composition in an amount of at most 0.30% by weight, with % by weight based on the total weight of the coating composition, for example at most 0.20% by weight, for example at most 0.18% by weight, for example at most 0.16% by weight, for example at most 0.14% by weight, for example at most 0.11% by weight, for example at most 0.10% by weight; and wherein the aldoxime or ketoxime of formula (II) is selected from the group comprising methyl ethyl ketoxime, dimethyl ketoxime, cyclohexanone oxime, methyl isobutyl ketoxime, formaldehyde oxime, acetaldehyde oxime, propionaldehyde oxime, butyraldehyde oxime, isobutyraldehyde oxime, pentan-2-one oxime, pentan-3-one oxime, cyclopentanone oxime, 3-methylbutyraldehyde oxime, hexan-2-one oxime, heptanal oxime, heptan-2-one oxime, heptan-3-one oxime, heptan-4-one oxime, 2,4-dimethylpentan-3-one oxime, 5-methylhexan-2-one oxime, benzaldehyde oxime, salicylaldoxime, acetophenone oxime, benzophenone oxime, 3-pyridinealdoxime, and 4-pyridinealdoxime.

66. The coating composition or use according to any one of statements 1 to 65, wherein the ketoxime of formula (II) is present in said composition in an amount of at most 0.40% by weight, with % by weight based on the total weight of the coating composition; for example at most 0.30% by weight, for example at most 0.20% by weight, for example at most 0.18% by weight, for example at most 0.16% by weight, for example at most 0.14% by weight, for example at most 0.11% by weight, for example at most 0.10% by weight; and the or ketoxime of formula (II) is selected from the group comprising methyl ethyl ketoxime, dimethyl ketoxime, cyclohexanone oxime, and methyl isobutyl ketoxime.

67. The coating composition or use according to any one of statements 1 to 66, wherein the ketoxime of formula (II) is present in said composition in an amount of at most 0.40% by weight, with % by weight based on the total weight of the coating composition; for example at most 0.30% by weight, for example at most 0.20% by weight, for example at most 0.18% by weight, for example at most 0.16% by weight, for example at most 0.14% by weight, for example at most 0.11% by weight, for example at most 0.10% by weight; and wherein the ketoxime of formula (II) is selected from the group comprising methyl ethyl ketoxime, and dimethyl ketoxime.

68. The coating composition or use according to any one of statements 1 to 67, wherein the ketoxime of formula (II) is methyl ethyl ketoxime and is present in said composition in an amount of at most 0.40% by weight, with % by weight based on the total weight of the coating composition; for example at most 0.30% by weight, for example at most 0.20% by weight, for example at most 0.18% by weight, for example at most 0.16% by weight, for example at most 0.14% by weight, for example at most 0.11% by weight, for example at most 0.10% by weight.

69. The coating composition or use according to any one of statements 1 to 67, wherein the ketoxime of formula (II) is dimethyl ketoxime and is present in said composition in an amount of at most 0.40% by weight, with % by weight based on the total weight of the coating composition; for example at most 0.30% by weight, for example at most 0.20% by weight, for example at most 0.18% by weight, for example at most 0.16% by weight, for example at most 0.14% by weight, for example at most 0.11% by weight, for example at most 0.10% by weight.

70. The coating composition or use according to any one of statements 1 to 69, wherein the oxidatively drying binder is an alkyd binder.

71. The coating composition or use according to any one of statements 1 to 70, wherein the oxidatively drying binder is an alkyd binder; wherein the alkyd is a medium oil alkyd, a long oil alkyd, or a very long oil alkyd.

72. The coating composition or use according to any one of statements 1 to 71, wherein the oxidatively drying binder is an alkyd binder; wherein the alkyd is a modified alkyd, preferably a polyurethane modified alkyd.

73. The coating composition or use according to any one of statements 1 to 72, wherein the coating composition comprises at most 0.01% by weight Al, with % by weight based on the total weight of the coating composition, preferably at most 0.001% by weight, preferably at most 0.0001% by weight, preferably at most 0.00001% by weight.

74. The coating composition or use according to any one of statements 1 to 73, wherein the coating composition is substantially free of aluminium.

75. Use of the coating composition according any one of statements 1 to 74, in a varnish, lacquer, paint, stain, enamel, printing ink, or floor covering.

76. A substrate having applied thereon a coating composition according to any one of statements 1 or 3 to 75.

According to a first aspect, the present invention relates to a coating composition comprising an oxidatively drying binder and an anti-skinning agent, the anti-skinning agent comprising:

a) a diketone, preferably of formula I

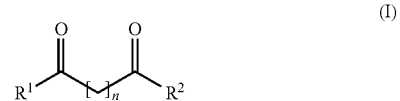

wherein
n is an integer selected from 1 and 2, preferably wherein n is 1; and
$R^1$ is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; preferably $R^1$ is selected from the group comprising $C_{1-10}$alkyl, $C_{6-12}$aryl, $C_{6-12}$aryl$C_{1-6}$alkyl, heteroaryl, heteroaryl$C_{1-6}$alkyl, each group being optionally substituted with one or more substituents each independently selected from the group comprising $C_{1-6}$alkyl, —OH, and halogen; preferably $R^1$ is selected from $C_{1-10}$alkyl, optionally substituted with one or more substituents each independently selected from the group comprising $C_{1-6}$alkyl, —OH, and halogen; preferably $R^1$ is selected from $C_{1-6}$alkyl, preferably $C_{1-4}$alkyl, preferably $C_{1-2}$alkyl, preferably methyl;
$R^2$ is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; preferably $R^2$ is selected from the group comprising $C_{1-10}$alkyl, $C_{6-12}$aryl, $C_{6-12}$aryl$C_{1-6}$alkyl, heteroaryl, heteroaryl$C_{1-6}$alkyl, each group being optionally substituted with one or more substituents each independently selected from the group comprising $C_{1-6}$alkyl, —OH, and halogen; preferably $R^2$ is selected from $C_{1-10}$alkyl, optionally substituted with one or more substituents each independently selected from the group comprising $C_{1-6}$alkyl, —OH, and halogen; preferably $R^2$ is selected from $C_{1-6}$alkyl, preferably $C_{1-4}$alkyl, preferably $C_{1-2}$alkyl, preferably methyl;
or
$R^1$ taken together with $R^2$ form a 4, 5, 6, 7, 8, 9 or 10-membered carbon ring, optionally substituted with one or more substituents each independently selected from the group comprising $C_{1-6}$alkyl, —OH, and halogen; preferably a 5, 6, or 7-membered carbon ring, optionally substituted with one or more substituents each independently selected from the group comprising $C_{1-6}$alkyl, —OH, and halogen; preferably a 5, or 6-membered carbon ring; and b) an aldoxime or ketoxime, preferably of formula II

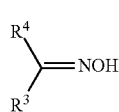

wherein $R^3$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; preferably $R^3$ is hydrogen or is selected from the group comprising $C_{1-10}$alkyl, $C_{6-12}$aryl, $C_{6-12}$aryl$C_{1-6}$alkyl, heteroaryl, heteroaryl $C_{1-6}$alkyl, each group being optionally substituted with one or more substituents each independently selected from the group comprising $C_{1-6}$alkyl, —OH, and halogen; preferably $R^3$ is hydrogen or $C_{1-10}$alkyl; preferably $R^3$ is selected from hydrogen or $C_{1-6}$alkyl, preferably hydrogen or $C_{1-4}$alkyl.

$R^4$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; preferably $R^4$ is hydrogen or is selected from the group comprising $C_{1-10}$alkyl, $C_{6-12}$aryl, $C_{6-12}$aryl$C_{1-6}$alkyl, heteroaryl, heteroaryl $C_{1-6}$alkyl, each group being optionally substituted with one or more substituents each independently selected from the group comprising $C_{1-6}$alkyl, —OH, and halogen; preferably $R^4$ is hydrogen or $C_{1-10}$alkyl; preferably $R^4$ is selected from hydrogen or $C_{1-6}$alkyl, preferably hydrogen or $C_{1-4}$alkyl;

or $R^3$ taken together with $R^4$ form a 5, 6, 7, 8, 9 or 10-membered carbon ring, optionally substituted with one or more substituents each independently selected from the group comprising $C_{1-6}$alkyl, —OH, and halogen; preferably a 5, 6, or 7-membered carbon ring, optionally substituted with one or more substituents each independently selected from the group comprising $C_{1-6}$alkyl, —OH, and halogen; preferably a 5 or 6-membered carbon ring.

According to a second aspect, the present invention relates to use of a composition comprising:

a) a diketone, preferably of formula I

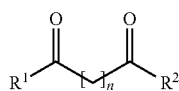

wherein n is an integer selected from 1 and 2, preferably wherein n is 1; and $R^1$ is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; preferably $R^1$ is selected from the group comprising $C_{1-10}$alkyl, $C_{6-12}$aryl, $C_{6-12}$aryl$C_{1-6}$alkyl, heteroaryl, heteroaryl$C_{1-6}$alkyl, each group being optionally substituted with one or more substituents each independently selected from the group comprising $C_{1-6}$alkyl, —OH, and halogen; preferably $R^1$ is selected from $C_{1-10}$alkyl, optionally substituted with one or more substituents each independently selected from the group comprising $C_{1-6}$alkyl, —OH, and halogen; preferably $R^1$ is selected from $C_{1-6}$alkyl, preferably $C_{1-4}$alkyl, preferably $C_{1-2}$alkyl, preferably methyl;

$R^2$ is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; preferably $R^2$ is selected from the group comprising $C_{1-10}$alkyl, $C_{6-12}$aryl, $C_{6-12}$aryl$C_{1-6}$alkyl, heteroaryl, heteroaryl$C_{1-6}$alkyl, each group being optionally substituted with one or more substituents each independently selected from the group comprising $C_{1-6}$alkyl, —OH, and halogen; preferably $R^2$ is selected from $C_{1-10}$alkyl, optionally substituted with one or more substituents each independently selected from the group comprising $C_{1-6}$alkyl, —OH, and halogen; preferably $R^2$ is selected from $C_{1-6}$alkyl, preferably $C_{1-4}$alkyl, preferably $C_{1-2}$alkyl, preferably methyl;

or $R^1$ taken together with $R^2$ form a 4, 5, 6, 7, 8, 9 or 10-membered carbon ring, optionally substituted with one or more substituents each independently selected from the group comprising $C_{1-6}$alkyl, —OH, and halogen; preferably a 5, 6, or 7-membered carbon ring, optionally substituted with one or more substituents each independently selected from the group comprising $C_{1-6}$alkyl, —OH, and halogen; preferably a 5, or 6-membered carbon ring; and b) an aldoxime or ketoxime, preferably of formula II

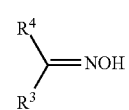

wherein $R^3$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; preferably $R^3$ is hydrogen or is selected from the group comprising $C_{1-10}$alkyl, $C_{6-12}$aryl, $C_{6-12}$aryl$C_{1-6}$alkyl, heteroaryl, heteroaryl $C_{1-6}$alkyl, each group being optionally substituted with one or more substituents each independently selected from the group comprising $C_{1-6}$alkyl, —OH, and halogen; preferably $R^3$ is hydrogen or $C_{1-10}$alkyl; preferably $R^3$ is selected from hydrogen or $C_{1-6}$alkyl, preferably hydrogen or $C_{1-4}$alkyl;

$R^4$ is hydrogen or is selected from the group comprising $C_{1-24}$alkyl, $C_{6-20}$aryl, $C_{6-20}$aryl$C_{1-12}$alkyl, heteroaryl, heteroaryl$C_{1-12}$alkyl, each group being optionally substituted with one or more substituents each independently selected from the group comprising $C_{1-6}$alkyl, —OH, and halogen; preferably $R^4$ is hydrogen or is selected from the group comprising $C_{1-10}$alkyl, $C_{6-12}$aryl, $C_{6-12}$aryl$C_{1-6}$alkyl, heteroaryl, heteroaryl $C_{1-6}$alkyl, each group being optionally substituted with one or more substituents each independently selected from the group comprising $C_{1-6}$alkyl, —OH, and halogen; preferably $R^4$ is hydrogen or $C_{1-10}$alkyl; preferably $R^4$ is selected from hydrogen or $C_{1-6}$alkyl, preferably hydrogen or $C_{1-4}$alkyl;

or $R^3$ taken together with $R^4$ form a 5, 6, 7, 8, 9 or 10-membered carbon ring, optionally substituted with one or more substituents each independently selected from the group comprising $C_{1-6}$alkyl, —OH, and halogen; preferably a 5, 6, or 7-membered carbon ring, optionally substituted with one or more substituents each independently selected from the group comprising $C_{1-6}$alkyl, —OH, and halogen; preferably a 5 or 6-membered carbon ring;

as an anti-skinning agent in a coating composition comprising an oxidatively drying binder.

In what follows, preferred embodiments for the first aspect of the invention are equally preferred embodiments for the second aspect, and vice versa.

The coating composition comprises at least one diketone, preferably of formula (I). The diketone of formula (I) is preferably added to the composition as a neutral molecule, not as the anion thereof. In some embodiments, the coating composition comprises two or more different diketones of formula (I).

In some preferred embodiments, the composition comprises at least 0.3% by weight of diketone of formula (I), with % by weight based on the total weight of the coating composition, preferably at least 0.4% by weight, preferably at least 0.5% by weight, preferably at least 0.6% by weight, preferably at least 0.7% by weight, preferably at least 0.8% by weight, with % by weight based on the total weight of the coating composition, preferably at least 0.9% by weight. In some preferred embodiments, the composition comprises at least 1.0% by weight of diketone of formula (I), with % by weight based on the total weight of the coating composition, for example at least 1.2% by weight, for example at least 1.4% by weight, for example at least 1.6% by weight, for example at least 1.8% by weight, for example at least 2.0% by weight.

In some preferred embodiments, the composition comprises at most 5.0% by weight of diketone of formula (I), with % by weight based on the total weight of the coating composition, for example at most 4.5% by weight, for example at most 4.0% by weight, for example at most 3.5% by weight, for example at most 3.0% by weight.

In some preferred embodiments, the composition comprises a diketone of formula (I), wherein $R^1$ and $R^2$ are each independently selected from $C_{1-24}$alkyl, optionally substituted with one or more substituents each independently selected from the group comprising $C_{1-6}$alkyl, —OH, and halogen. In some preferred embodiments, the composition comprises a diketone of formula (I), wherein $R^1$ and $R^2$ are each independently selected from unsubstituted $C_{1-24}$alkyl, preferably from $C_{1-6}$alkyl, preferably from $C_{1-3}$alkyl, preferably from methyl and ethyl. In some preferred embodiments, the composition comprises a diketone of formula (I), wherein $R^1$ is methyl. In some preferred embodiments the composition comprises a diketone of formula (I), wherein $R^2$ is methyl. In some preferred embodiments the composition comprises a diketone of formula (I), wherein $R^1$ is methyl and $R^2$ is methyl.

In some preferred embodiments, the composition comprises a diketone of formula (I), wherein n is 1 or 2, more preferably n is 1.

The coating composition comprises at least one aldoxime or ketoxime, preferably of formula (II). In some embodiments, the coating composition comprises two or more different aldoximes or ketoximes of formula (II).

In some preferred embodiments, the at least one aldoxime or ketoxime is described by paragraphs [0045]-[0057] of EP2623199, hereby incorporated by reference in its entirety.

In some preferred embodiments, the at least one aldoxime or ketoxime is selected from the lists in paragraphs [0058]-[0059] of EP2623199, hereby incorporated by reference in its entirety. In some preferred embodiments, the at least one aldoxime or ketoxime is selected from the list in paragraph [0058] of EP2623199, hereby incorporated by reference in its entirety. In some preferred embodiments, the at least one aldoxime or ketoxime is selected from the list in paragraph [0059] of EP2623199, hereby incorporated by reference in its entirety.

In some preferred embodiments, the composition comprises at most 1.0% by weight of aldoxime or ketoxime of formula (II), with % by weight based on the total weight of the coating composition. In some preferred embodiments, the composition comprises at most 0.80% by weight of aldoxime or ketoxime of formula (II), with % by weight based on the total weight of the coating composition. In some preferred embodiments, the composition comprises at most 0.60% by weight of aldoxime or ketoxime of formula (II), with % by weight based on the total weight of the coating composition. In some preferred embodiments, the composition comprises at most 0.40% by weight of aldoxime or ketoxime of formula (II), with % by weight based on the total weight of the coating composition. In some preferred embodiments, the composition comprises at most 0.30% by weight of aldoxime or ketoxime of formula (II), with % by weight based on the total weight of the coating composition. In some preferred embodiments, the composition comprises at most 0.20% by weight of aldoxime or ketoxime of formula (II), with % by weight based on the total weight of the coating composition, for example at most 0.18% by weight, for example at most 0.16% by weight, for example at most 0.14% by weight, for example at most 0.11% by weight, for example at most 0.10% by weight.

In some preferred embodiments, the composition comprises at least 0.01% by weight of aldoxime or ketoxime of formula (II), with % by weight based on the total weight of the coating composition, for example at least 0.02% by weight, for example at least 0.03% by weight, for example at least 0.04% by weight, for example at least 0.05% by weight, for example at least 0.06% by weight, for example at least 0.07% by weight, for example at least 0.08% by weight, for example at least 0.09% by weight.

In some preferred embodiments, the composition comprises at least one aldoxime or ketoxime of formula (II), wherein $R^3$ is selected from hydrogen or $C_{1-24}$alkyl, preferably $C_{1-6}$alkyl, preferably $C_{1-3}$alkyl, preferably from methyl and ethyl, and $R^4$ is selected from $C_{1-24}$alkyl, preferably $C_{1-6}$alkyl, preferably $C_{1-4}$alkyl.

In some preferred embodiments, the composition comprises at least one aldoxime or ketoxime of formula (II) selected from the group comprising (systematic name and possible synonyms between brackets) methyl ethyl ketoxime (N-Hydroxy-2-butanimine), dimethyl ketoxime (N-Hydroxy-2-propanimine), acetone oxime, cyclohexanone oxime (N-Hydroxycyclohexanimine), methyl isobutyl ketoxime (N-Hydroxy-4-methyl-2-pentanimine), formaldehyde oxime, acetaldehyde oxime (N-Hydroxyethanimine), propionaldehyde oxime (N-Hydroxy-1-propanimine), butyraldehyde oxime (N-Hydroxy-1-butanimine), isobutyraldehyde oxime (N-Hydroxy-2-methyl-1-propanimine), pentan-2-one oxime (N-Hydroxy-2-pentanimine), pentan-3-one oxime (N-Hydroxy-3-pentanimine), cyclopentanone oxime (N-Hydroxycyclopentanimine), 3-methylbutyraldehyde oxime (N-Hydroxy-3-methyl-1-butanimine), hexan-2-one oxime (N-Hydroxy-2-hexanimine), heptanal oxime (N-Hydroxy-1-heptanimine), heptan-2-one oxime (N-Hydroxy-2-heptanimine), heptan-3-one oxime (N-Hydroxy-3-heptanimine), heptan-4-one oxime (N-Hydroxy-4-heptanimine), 2,4-dimethylpentan-3-one oxime (N-Hydroxy-2,4-dimethyl-3-pentanimine), 5-methylhexan-2-one oxime (N-Hydroxy-5-methyl-2-hexanimine), benzaldehyde oxime (N-Hydroxy-1-phenylmethanimine), salicylaldoxime (2-[(Hydroxyimino)methyl]phenol), acetophenone oxime (N-Hydroxy-1-phenylethanimine), benzophenone oxime (N-Hydroxy-1,1-diphenylmethanimine), 3-pyridinealdoxime (N-Hydroxy-1-(3-pyridinyl)methanimine, nicotinaldoxime), 4-pyridinealdoxime (N-Hydroxy-1-(4-pyridinyl)methanimine, isonicotinaldehyde oxime), pentanal oxime (N-Hydroxy-1-pentanimine), and 3-methyl-2-butanone oxime (N-Hydroxy-3-methyl-2-butanimine). In some preferred embodiments, the ketoxime of formula (II) is selected from the group comprising methyl ethyl ketoxime, dimethyl ketoxime, cyclohexanone oxime, and methyl isobutyl ketoxime. In some preferred embodiments, the ketoxime of formula (II) is selected from methyl ethyl ketoxime or dimethyl ketoxime. In some preferred embodiments, the ketoxime of formula (II) is methyl ethyl ketoxime. In some preferred embodiments, the ketoxime of formula (II) is dimethyl ketoxime.

In some preferred embodiments, the coating composition further comprises at least one metal complex comprising at least one metal, wherein the at least one metal is selected from the group comprising cobalt (Co), manganese (Mn), iron (Fe), vanadium (V), cerium (Ce), copper (Cu), lead (Pb), calcium (Ca), zirconium (Zr), lanthanum (La), neodymium (Nd), bismuth (Bi), strontium (Sr), zinc (Zn), lithium (Li), potassium (K), and barium (Ba), preferably wherein the at least one metal is selected from the group comprising cobalt (Co), manganese (Mn), iron (Fe), vanadium (V), cerium (Ce), copper (Cu), and lead (Pb). The metal complexes can be used as driers. A combination of metal driers can be present as a drier composition.

As used herein, the term "drier" (which is also referred to synonymously as "siccative" when in solution) refers to organometallic compounds that are soluble in organic solvents and binders. They are added to unsaturated oils and binders in order to appreciably reduce their drying times, i.e. the transition of their liquid films to the solid phase. Driers are available either as solids or in solution (siccatives). Suitable solvents are organic solvents, fatty acid esters and binders. The driers are present in amounts expressed as weight percent of the metal based on the weight of binder solids (or resin) unless stated otherwise.

As used herein, the term "drier composition" refers to the mixture of driers as presently claimed.

In some preferred embodiments of the invention, the coating composition comprises metal salts of an organic acid, for example a calcium salt, a cobalt salt, or a zirconium salt of an organic acid. Preferably the organic acid is a carboxylate. Preferably, the organic acid is selected from branched-chain or straight-chain saturated and unsaturated aliphatic, aromatic and alicyclic monocarboxylic acids having 6 to 22 carbon atoms, cycloaliphatic monocarboxylic acids having 6 to 10 carbon atoms, or mixtures of these acids, preferably the organic acid is selected from the group comprising 2-ethylbutanoic acid, 2,2-dimethylpentanoic acid, 2-ethylpentanoic acid, 2-ethyl-4-methylpentanoic acid, 2-ethylhexanoic acid, isooctanoic acid, isononanoic acid, 2-ethylhexanoic acid, isooctanoic acid, isononanoic acid, neononanoic acid, nonanoic acid, isodecanoic acid, neodecanoic acid, 2-ethyldecanoic acid, isotridecanoic acid, isotetradecanoic acid, n-hexanoic acid, n-octanoic acid, n-decanoic acid, n-dodecanoic acid, cyclopentanoic acid, methylcyclopentanoic acid (such as 1-methylcyclopentanoic acid, 2-methylcyclopentanoic acid, or 3-methylcyclopentanoic acid), cyclohexanoic acid, methylcyclohexanoic acid (such as 1-methylcyclohexanoic acid, 2-methylcyclohexanoic acid, 3-methylcyclohexanoic acid, or 4-methylcyclohexanoic acid), 1,2-dimethylcyclohexanoic acid, cycloheptanoic acid, myristic acid, stearic acid, arachidic acid, behenic acid, oleic acid, linoleic acid, tall oil fatty acid, erucic acid, p-tert-butylbenzoic acid, monobutyl maleate, monodecyl phthalate, naphthenic acid and mixtures thereof. Particularly preferred acids include 2-ethylhexanoic acid, isononanoic acid, neodecanoic acid, decanoic acid, oleic acid, naphthenic acid and mixtures thereof.

In some embodiments, the coating composition also comprises at least one Co salt of an organic acid. Examples of suitable cobalt (Co) salts of an organic acid include, but are not limited to: cobalt carboxylates such as cobalt neodecanoates, cobalt isononate, cobalt tallates, cobalt oleate, cobalt linoleates, cobalt octoates, cobalt naphthenates, and cobalt boroacylates. Such cobalt (Co) driers are available from the OM Group, Inc., and include Cobalt Ten-Cem®, Cobalt Cem-All®, Cobalt Hex-Cem®, Cobalt Nap-All, Cobalt Lin-All®, and Ultra-Dri® 360D. Suitable cobalt driers may also be available from Rockwood Pigments (now Byk), such as Durham Cobalt and Durham Nuodex Cobalt. Suitable cobalt driers may also be polymeric cobalt driers, for example those found in WO2010076031, hereby incorporated in its entirety by reference, such as Ecos ND15.

In some embodiments, the coating composition also comprises at least one Ca salt of an organic acid. Examples of suitable calcium (Ca) salts of an organic acid include, but are not limited to: calcium carboxylates such as calcium neodecanoates, calcium octoates, calcium tallates, calcium linoleates, calcium propionate, calcium decanate, calcium isononanoate, and calcium naphthenates. Such calcium (Ca) driers are available from the OM Group, Inc., and include Calcium Ten-Cem®, Calcium Cem-All®, Calcium Hex-Cem®, and Calcium Nap-All. Suitable calcium driers may also be available from Rockwood Pigments (now Byk), such as Durham Calcium and Durham Nuodex Calcium.

In some embodiments, the coating composition also comprises at least one Zr salt of an organic acid. Examples of suitable zirconium (Zr) salts of an organic acid include, but are not limited to: zirconium carboxylates such as zirconium propionate, zirconium neodecanoates, zirconium octoates, and zirconium naphthenates and mixtures thereof. Such zirconium (Zr) driers are available from the OM Group, Inc., and include Zirconium Hex-Cem®. Suitable zirconium driers may also be available from Rockwood Pigments (now Byk), such as Durham Zirconium and Durham Nuodex Zirconium.

In some embodiments, the coating composition also comprises at least one Sr salt of an organic acid. Examples of suitable strontium (Sr) salts of an organic acid include, but are not limited to: strontium carboxylates such as strontium octoates, strontium neodecanoates, and strontium naphthenates, and mixtures thereof. Such strontium (Sr) driers are available from the OM Group, Inc., and include Strontium Hex-Cem® and Strontium Octa Soligen®. Suitable Strontium driers may also be available from Rockwood Pigments (now Byk), such as Durham Strontium.

In some embodiments, the coating composition comprises at least one Co salt of an organic acid, and at least one Ca salt of an organic acid. In some embodiments, the composition comprises at least one Co salt of an organic acid, and at least one Zr salt of an organic acid. In some embodiments, the composition comprises at least one Co salt of an organic acid, and at least one Sr salt of an organic acid. In some embodiments, the composition comprises at least one Ca salt of an organic acid, and at least one Zr salt of an organic acid. In some embodiments, the composition comprises at least one Ca salt of an organic acid, and at least one Sr salt of an organic acid. In some embodiments, the composition comprises at least one Co salt of an organic acid, at least one Ca salt of an organic acid, and at least one Zr salt of an organic acid. In some embodiments, the composition comprises at least one Co salt of an organic acid, at least one Ca salt of an organic acid, and at least one Sr salt of an organic acid.

In some preferred embodiments, the coating composition comprises at least one autoxidizable alkyd binder.

As used herein, the term "alkyd binder" or "alkyd resin" are used interchangeably. Suitable autoxidizable alkyd resin for use in the invention, are in general the reaction product of the esterification of polyhydric alcohols with polybasic acids (or their anhydrides) and unsaturated fatty acids (or glycerol esters thereof), for example derived from linseed oil, tung oil, soybean oil, sunflower oil, as well as from other drying or semi-drying oils. Alkyd resins are well-known in the art and need not to be further described herein. The properties are primarily determined by the nature and the ratios of the alcohols and acids used and by the degree of condensation. Suitable alkyds include long oil, very long oil and medium oil alkyd resins e.g. derived from 45 to 85 wt % of fatty acids, preferably derived from 45 to 70 wt % of fatty acids. As used herein, the term "long oil alkyd" refers to alkyd with an oil content of between 60 and 75 wt %, and a fatty acid content of 57 to 70 wt %. As used herein, the term "medium oil alkyd" refers to alkyd with an oil content of between 45 wt % and 60 wt %, and a fatty acid content of 42 to 57 wt %. As used herein, the term "very long oil alkyd" refers to alkyd with an oil content of between 75 and 85 wt %, and a fatty acid content of 70 to 80 wt %. In an embodiment, the alkyd is a medium oil alkyd. In another embodiment, the alkyd is a long oil alkyd. In another embodiment, the alkyd is a very long oil alkyd. To improve the performance of the resins, the composition of the long oil and medium oil alkyd may be modified. For example, polyurethane modified alkyds, silicone modified alkyds, styrene modified alkyds, acrylic modified alkyds (e.g. (meth)acrylic modified alkyds), vinylated alkyds, polyamide modified alkyds, and epoxy modified alkyds or mixtures thereof are also suitable alkyd resins to be used in the present composition.

Preferably, said at least one autoxidizable alkyd binder is selected from a medium or long or very long oil alkyd, a silicone modified alkyd, a polyurethane modified alkyd, acrylic modified alkyd, polyamide modified alkyd, or a combination thereof. Most preferably, said alkyd binder is a long or very long oil alkyd, a silicone modified alkyd, a polyurethane modified alkyd, polyamide modified alkyd, or a combination thereof.

The amount of alkyd binder in the present compositions can typically range from about 10 to 98 wt %, such as about 15 to about 90 wt %, preferably about 20 to 80 wt %, preferably about 20 to 70 wt % based on the total weight of the composition.

In a preferred embodiment of the present invention, the alkyd binder has a solids content of at least 50%, preferably at least 55%, more preferably at least 60% yet more preferably at least 65%, yet more preferably at least 70%, for example at least 75%, for example at least 80%, whereby the solids content is defined as non-volatile solids content or non-volatile matter or nvm. In a preferred embodiment of the present invention, the alkyd binder has a solids content of at most 95%, preferably at least 90%, more preferably at most 85%, whereby the solids content is defined as non-volatile solids content or non-volatile matter or nvm. In a preferred embodiment of the present invention, the alkyd binder has a solids content of at least 50% and at most 95%, preferably of at least 70% and at least 90%, more preferably of at least 80% and at most 85%, whereby the solids content is defined as non-volatile solids content or non-volatile matter or nvm. As used herein, the term "solids content" refers to the proportion of non-volatile material contained in an adhesive, coating, ink, paint, or other suspension. It is the material left after the volatile solvent (which serves as a carrier or vehicle for the solid content) has vaporized. The solids content may be determined by evaporating to dryness a weighed sample of solution and determining the percent residue. More details on how the solids content may be measured can be found in ISO3251.

In some preferred embodiments, the coating composition does not comprise aluminium-organic ligand complexes (Al-organic ligand complexes), since this negatively influences the viscosity. Preferably, the coating composition comprises at most 0.01% by weight Al-organic ligand complexes, with % by weight based on the total weight of the coating composition, preferably at most 0.001% by weight, preferably at most 0.0001% by weight, preferably at most 0.00001% by weight. Preferably, the coating composition is substantially free of aluminium-organic ligand complexes. Preferably, the coating composition is free of aluminium-organic ligand complexes.

In an embodiment, said composition can be formulated as an emulsion, preferably an alkyd emulsion. Alkyd emulsions can be made in a variety of different methods. In an embodiment, said composition additionally comprises water and an alkyd emulsion is obtained by phase inversion or homogenisation. Despite the choice of emulsion technology/process the outcome is dispersed alkyd droplets in a water phase, wherein the water is the continuous media of the system. Emulsifiers can be used. A combination of two or more different surfactants may be used, such as a combination of one ionic (small molecule that possesses high diffusion rate) for promoting the drops during the formation and one nonionic (large polymeric surfactant) for stabilizing the droplets on a long term perspective. Alternatively stable alkyd emulsions can be produced in the absence of an external emulsifier by neutralizing the free carboxyl groups of the alkyd resin with an amine. After neutralization alkyd resins can be emulsified directly in water without use of low molecular weight emulsifiers. The shearing device can be for instance a dissolver, specially designed stirrer, rotor-stator homogenizer or high pressure homogenizer. A typical solid content of an alkyd emulsion is from 30-70%.

Preferably, the coating composition is a solvent-borne coating composition.

As used herein, the term "solvent-borne coating composition" refers to a composition that utilizes one or more volatile organic materials as the primary dispersing medium.

According to certain embodiments, the coating compositions of the present invention can be substantially free of water, or, in some cases, completely free of water.

As used herein, the term "volatile organic material" refers to any organic compound having an initial boiling point less than or equal to 250° C. measured at a standard pressure of 101.3 kPa.

As used herein, the term "organic compound" refers to any compound containing at least the element carbon and one or more of hydrogen, oxygen, sulfur, phosphorus, silicon, nitrogen, or a halogen, with the exception of carbon oxides and inorganic carbonates and bicarbonates.

Volatile organic materials are often included in coating compositions to reduce the viscosity of the composition sufficiently to enable forces available in simple coating techniques, such as spraying, to spread the coating to controllable, desired and uniform thicknesses. Also, volatile organic materials may assist in substrate wetting, resinous component compatibility, package stability and film formation. Non-limiting examples of suitable volatile organic materials (also referred as solvent) for use in the present composition include aliphatic, cycloaliphatic, aromatic hydrocarbons and oxygenated solvents, such as hexane, heptane, octane, isooctane, cyclohexane, cycloheptane, toluene and xylene; isoparafins; ketones, such as methyl ethyl ketone and methyl isobutyl ketone; alcohols, such as isopropyl alcohol, normal-butyl alcohol and normal-propyl alcohol; monoethers of glycols, such as the monoethers of ethylene glycol and diethylene glycol; di-ethers of glycols such as dipropylene glycol dimethyl ether; monoether glycol acetates, such as 2-ethoxyethyl acetate; as well as compatible mixtures thereof. As examples of such solvents may be mentioned hydrocarbon solvents available under the trademarks Shellsol H, Shellsol K, Shellsol D40, Shellsol D60, Shellsol D70, and Shellsol AB, all from Shell Chemicals, the Netherlands, the trademarked Solvesso 150 solvent from Esso and also: Exxsol D40, Exxsol D60 and Exxsol D80, and solvents such as ethyl diglycol, ethyl glycol acetate, butyl glycol, butyl glycol acetate, butyl diglycol, butyl diglycol acetate, and methoxypropylene glycol acetate. Preferably the solvent is an aliphatic hydrocarbon solvent, preferably a high-boiling aliphatic hydrocarbon solvent, such as Shellsol D40 and D60. (The boiling point range for Shellsol D40 is 163-196° C. and for D60: 177-213° C.).

As used herein, the term "substantially free" means that the material being discussed is present in the composition, if at all, as an incidental impurity. In other words, the material does not affect the properties of the composition. As used herein, the term "completely free" means that the material being discussed is not present in the composition at all.

In certain embodiments, the amount of water present in the coating compositions of the present invention is less than 25 wt %, such as less than 20 wt %, such as less than 15 wt %, such as less than 10 wt %, such as less than 5 wt %, or, in some cases, less than 2 wt %, or, in yet other cases, less than 1 wt %, with the wt % being based on the total weight of the coating composition. The amount of water should remain lower than 25 wt % such that the alkyd binder remains in the continuous phase In a preferred embodiment, the coating composition further comprises at least one organic solvent in an amount of about 0.1 wt % to about 50 wt %, preferably about 1.0 wt % to about 45 wt %, preferably about 5 wt % to about 40 wt %, preferably about 10 wt % to about 35 wt %, preferably about 15 wt % to about 30 wt %, based on the total weight of the coating composition.

In certain embodiments, the coating compositions of the present invention comprise at least one colorant. The colorant component of the coating composition may comprise one or more inorganic or organic, transparent or non-transparent pigments. Non-limiting examples of such pigments are titanium dioxide, iron oxides, mixed metal oxides, bismuth vanadate, chromium oxide green, ultramarine blue, carbon black, lampblack, monoazo and diazo pigments, anthraquinones, isoindolinones, isoindolines, quinophthalones, phthalocyanine blues and greens, dioxazines, quinacridones and diketo-pyrrolopyrroles; and extender pigments including ground and crystalline silica, barium sulfate, magnesium silicate, calcium silicate, mica, micaceous iron oxide, calcium carbonate, zinc oxide, aluminum hydroxide, aluminum silicate and aluminum silicate, gypsum, feldspar, talcum, kaolin, and the like. The amount of pigment that is used to form the coating composition is understood to vary, depending on the particular composition application, and can be zero when a clear composition is desired.

For example, a coating composition may comprise up to about 300 wt %, for example about 0 to about 200 wt % of pigment based on the solids content of the alkyd resin (pigment/binder), preferably up to 100 wt % of pigment based on the solids content of the alkyd resin. Depending on the particular end use, a preferred composition may comprise approximately 0 to 100 wt % of pigment based on the solids content of the alkyd resin.

The coating compositions of the present invention may include other additives, e.g. catalysts, viscosity stabilizers, thixotropic agents, anti-sagging agents, anti-oxidants, anti-fouling agents, anti-gelling agents, bactericides, fungicides, algaecides, insecticides, anti-settling agents, antifoaming agents, slip agents, flow and leveling agents, rheology modifiers, photo-initiators, UV-absorbers, pigment synergists, HALS-radical scavengers, corrosion inhibitors, matting agents, waxes, mineral oils, flame retardants, anti-static agents, loss of dry inhibitors, optical brighteners, adhesion promoters, diluents, elastomers, plasticizers, air release agents, desiccants, anti-crater additives, reinforcing agents, dispersing aids, substrate wetting agents, odorants, open-time extenders, freeze-thaw stabilizers, pH-modifiers, corrosion-inhibitive pigments, additional hardeners and additional curable compounds, depending on the application. Certain embodiments of the coating compositions of the present invention include surface active agents, such as any of the well-known anionic, cationic or nonionic surfactants or dispersing agents. Examples of suitable additives that may be added to the coating composition may be found in Additives Guide, Paint & Coatings Industry Magazine, June 2014, hereby incorporated by reference. If desired, other resinous materials can be utilized in conjunction with the aforementioned alkyd resins.

The driers, diketone, aldoxime, ketoxime or optionally colorants, pigments and extenders and optionally other additives may be formulated into the coating compositions by mixing and, if appropriate, dispersing and grinding with the liquid binder.

In a preferred embodiment of the invention, the coating composition is formulated as a one package coating composition, also referred herein as one-component (1K) coating composition. In an embodiment of the invention, the coating composition is formulated as a two-component (2K) coating composition. In an embodiment of the invention, the coating composition is formulated as a multicomponent coating composition.

A "1K" or "one package" composition will be understood as referring to a composition wherein all of the components are maintained in the same container after manufacture, during storage, etc. A "two packages" or "2K" composition will be understood as referring to a composition wherein two components are maintained separately until just prior to application. A "multi packages" or "multicomponents" composition will be understood as referring to a composition wherein various components are maintained separately until just prior to application.

The coating composition according to the invention can be used and/or formulated as varnish, lacquer, paint, stain, enamel, printing ink or floor covering and similar compositions which contain autoxidizable alkyd binders.

According to a third aspect, the present invention also relates to the use of the coating composition according to the first aspect of the invention in a varnish, lacquer, paint, stain, enamel, printing ink or floor covering.

According to a fourth aspect, the present invention also relates to a substrate having applied thereon a coating composition according to the first aspect of the invention.

The coating compositions of the present invention can be applied to various substrates including wood, paper, foam, and synthetic materials (such as plastics including elastomeric substrates), leather, textiles, glass, ceramic, metals (such as iron, steel and aluminum), concrete, cement, brick, and the like.

As a result, the present invention is also directed to substrates at least partially coated with at least one coating composition of the present invention. The substrates may be pretreated before application of the at least one coating composition. The substrates may be post-treated after application of the at least one coating composition, with any other compositions.

Any known method can be used to apply the coating compositions of the invention to a substrate. Non-limiting examples of such application methods are spreading (e.g., with paint pad or doctor blade, or by brushing or rolling), spraying (e.g., air-fed spray, airless spray, hot spray, and electrostatic spray), flow coating (e.g., dipping, curtain coating, roller coating, and reverse roller coating), and electrodeposition. (See generally, R. Lambourne, Editor, Paint and Surface Coating: Theory and Practice, Eilis Horwood, 1987, page 39 et seq.).

The coating compositions of the present invention can be applied and fully cured at ambient temperature conditions in the range of from about −10° C. to 50° C. Curing of said polymer composition according to the invention typically can proceed very rapidly, and in general can take place at a temperature within the range of from −10° C. to +50° C., in particular from 0° C. to 40° C., more in particular from 3 to 25° C. However, compositions of the present invention may be cured by additional heating.

The coating compositions of the present invention may be used as a single coating, a top coating, a base coating in a two-layered system, or one or more layers of a multi-layered system including a clear top coating composition, colorant layer and base coating composition, or as a primer layer. A typical opaque system may comprise: 1 or 2 layers of primer and 1 or 2 layers of top coat (a total of 3 layers). Alternative opaque systems may comprise: 1 primer layer, 1 layer of mid coat and 1 layer top coat. Examples of transparent systems may comprise 1 layer of impregnant and 3 layers of top coats or 3 layers of top coat for maintenance work.

The invention will be more readily understood by reference to the following examples, which are included merely for purpose of illustration of certain aspects and embodiments of the present invention and are not intended to limit the invention.

EXAMPLES

Several examples and comparative examples are described hereunder illustrating the effect of the compositions according to embodiments of the present invention on the drying and skinning properties.

Unless otherwise indicated, all parts and all percentages in the following examples, as well as throughout the specification, are parts by weight or percentages by weight respectively.

The storage stability tests were performed in closed cans, filled to 60% of the volume and having an air packed head space of 40%. The jars containing the paint products were stored at 23° C. and examined at specified time intervals for signs of skin formation. A skin on the surface of the composition was considered to have formed when it had sufficient tensile strength to support a gentle indentation by a spatula. Anti-skinning performance was defined as the number of days at which skin formation was first observed.

Drying times were assessed in the following manner:

The test composition was cast on a glass plate by using a draw bar with a gap size of 100 μm.

Dust-free: the dust-free time was determined by dropping a wad of cotton wool of approximately 1 cm$^3$ onto the drying film from a height of 25 cm. The coating is considered dust-free if it does not pull fibres or leave marks when the cotton ball is blown gently of the drying film in a horizontal direction.

Tack-free: The coating is considered tack free if it does not pull fibres or leave marks when a wad of cotton (about 1 cm$^3$) is placed on the drying film with on top a load of 1 kg/3 cm$^2$ for 10 seconds and afterwards the cotton ball is blown gently away in a horizontal direction.

Drying times were obtained under ambient conditions of 23° C. and 50% RH and under adverse drying conditions of 5° C. and 85% RH.

Following driers were used:

Zirconium (18%) drier: siccative based on zirconium 2-ethylhexanoate and having a zirconium content of 18%.

Calcium (5%) drier: siccative based on calcium isononanoate and having a calcium content of 5%.

Cobalt (4%) drier: siccative having a cobalt content of 4%.

Cobalt (3%) drier: siccative having a cobalt content of 3%.

Following additives were used:

A radical scavenger: sterically hindered amine (HALS), a defoamer, and a compatibilizer.

Following oximes and ketones were used:

Dimethyl ketoxime: Exkin 518 (Rockwood Pigments, now Byk).

Methyl ethyl ketoxime: Exkin II from Rockwood Pigments, now Byk

Methyl isobutyl ketoxime: Luna-Skin MIBKO from DKSH

Cyclohexanone oxime: Exkin III from Rockwood Pigments, now Byk 2,4-pentanone: Sigma-Aldrich 2,3-butanedione: Aldrich tert-butyl acetoacetate: Eastman Example A A typical base paint without anti-skinning agents was prepared by mixing together the constituents as listed in Table 1.

TABLE 1

| constituents | parts by weight |
|---|---|
| urethane modified alkyd (75% nvm) | 41.0 |
| long oil alkyd (85% nvm) | 43.4 |
| high boiling aliphatic hydrocarbon solvent | 4.8 |
| calcium (5%) drier | 3.0 |
| zirconium (18%) drier | 3.6 |
| cobalt (4%) drier | 2.0 |
| defoamer | 1.1 |
| compatibilizer | 0.5 |
| HALS | 0.6 |
| Total = | 100 |

The solids content of the long oil alkyd was 85% nvm, the solids content of the urethane modified alkyd was 75% nvm. The total solids binder content of the base paint in Table 1 is 80 wt %. The solids content of the base paint of Table 1, including an average of 0.6% of volatile anti-skinning agent, is 74 wt %.

To portions of base paint were added an anti-skinning composition according to an embodiment of this invention or a comparative anti-skinning composition. The paints were observed over time for the formation of a skin at the air-liquid interface.

TABLE 2

| | comparative example 1 | comparative example 2 | comparative example 3 | comparative example 4 | example 1 | example 2 | example 3 | example 4 |
|---|---|---|---|---|---|---|---|---|
| | | | | parts by weight | | | | |
| base paint | 100 | 100 | 100 | 100 | 100 | 100 | 100 | 100 |
| methyl ethyl ketoxime | 0.10 | 0.20 | 0.50 | | 0.10 | 0.20 | 0.10 | 0.20 |
| 2,4-pentanedione | | | | 2.0 | 1.0 | 1.0 | 2.0 | 2.0 |
| time required for development of skin (days) | 2 | 21 | 119 | 14 | 63 | 98 | 133 | 196 |

The times required for the development of a skin on the air-liquid coating interphase as observed in case of the examples 1-4 in table 2 demonstrate the synergistic effect of the combination of low amounts of methyl ethyl ketoxime and 2,4-pentanedione. Comparable skin-free times can only be achieved at much higher concentrations of methyl ethyl ketoxime which lead to corresponding higher airborne concentrations after the application process. Low concentrations of methyl ethyl ketoxime alone, or 2,4-pentanedione in the absence of a ketoxime result in technically less desirable skin-free times.

Example B

A coating composition without anti-skinning agents was prepared by grinding in a bead mill and mixing the constituents together as listed in Table 3.

TABLE 3

| constituents | parts by weight |
|---|---|
| long oil alkyd (85% nvm) | 62.0 |
| polyurethane modified alkyd (60% nvm) | 10.0 |
| high boiling aliphatic hydrocarbon solvent | 10.0 |
| pigment dispersant | 1.8 |
| silicon dioxide amorphous | 6.0 |
| organically modified bentonite | 0.4 |
| defoamer | 0.3 |
| calcium (5%) drier | 4.8 |
| zirconium (18%) drier | 3.2 |
| cobalt (4%) drier | 1.5 |
| Total = | 100 |

The solids content of the long oil alkyd was 85% nvm, the solids content of the urethane modified alkyd was 60% nvm. The total solids binder content of the base paint in Table 3 is 83 wt %. The solids content of the base paint of Table 3, including an average of 0.8% of volatile anti-skinning agent, is 71 wt %.

To portions of the coating composition were added either an anti-skinning composition according this invention or a comparative anti-skinning system. The paint samples were observed recurrently and the onset of the surface skin formation was monitored. The results are shown in Table 4.

TABLE 4

| | comparative example 5 | comparative example 6 | comparative example 7 | comparative example 8 | comparative example 9 | comparative example 10 | example 5 | example 6 | example 7 | example 8 |
|---|---|---|---|---|---|---|---|---|---|---|
| | | | | | parts by weight | | | | | |
| base paint | 100 | 100 | 100 | 100 | 100 | 100 | 100 | 100 | 100 | 100 |
| dimethyl ketoxime | 0.10 | | | | | | 0.10 | | | |
| methyl ethyl ketoxime | | 0.10 | | | 0.10 | 0.10 | | 0.10 | | |
| methyl isobutyl ketoxime | | | 0.10 | | | | | | 0.10 | |
| cyclohexanone oxime | | | | 0.10 | | | | | | 0.10 |

TABLE 4-continued

| | comparative example 5 | comparative example 6 | comparative example 7 | comparative example 8 | comparative example 9 | comparative example 10 | example 5 | example 6 | example 7 | example 8 |
|---|---|---|---|---|---|---|---|---|---|---|
| | | | | | parts by weight | | | | | |
| 2,3-butanedione | | | | | 1.0 | | | | | |
| tert-butyl acetoacetate | | | | | | 1.0 | | | | |
| 2,4-pentanedione | | | | | | | 1.0 | 1.0 | 1.0 | 1.0 |
| time required for development of skin (days) | 1 | 1 | 1 | 1 | 3 | 2 | 92 | 70 | 35 | 63 |

The number of days required for the onset of skin formation as shown in Table 4, demonstrate that combinations of 2,4-pentanedione and low amounts of ketoximes perform well as anti-skinning composition for each of the tested ketoximes selected from the group comprising dimethyl ketoxime, methyl ethyl ketoxime, methyl isobutyl ketoxime, and cyclohexanone oxime (examples 5-8). Combinations of 2,3-butanedione or tert-butyl acetoacetate and methyl ethyl ketoxime are less effective as anti-skinning composition showing the preferred presence of an enolizable β-diketo moiety in the dione ligand and the restraints with respect to the pendant organic groups.

Example C

A with gloss enamel without anti-skinning agents was prepared by grinding in a bead mill and mixing the constituents together as listed in Table 5.

TABLE 5

| constituents | parts by weight |
|---|---|
| urethane modified alkyd (75% nvm) | 25.0 |
| long oil alkyd (80% nvm) | 36.5 |
| high boiling aliphatic hydrocarbon solvent | 6.2 |
| pigment dispersant | 0.5 |
| titanium dioxide | 24.0 |
| calcium (5%) drier | 2.7 |
| zirconium (18%) drier | 2.5 |
| cobalt (3%) drier | 0.8 |
| defoamer | 0.7 |
| compatibilizer | 0.5 |
| HALS | 0.6 |
| Total | 100 |

The solids content of the long oil alkyd was 80% nvm, the solids content of the urethane modified alkyd was 75% nvm. The total solids binder content of the base paint in Table 5 is 78 wt %. The solids content of the base paint of Table 3, including an average of 0.5% of volatile anti-skinning agent, is 76 wt %.

To portions of the white enamel were added either an anti-skinning composition according this invention or a comparative drier system. The test compositions were aged overnight before the drying performance was evaluated. The anti-skinning properties were measured in terms of the number of days until the coating material displayed skinning. The results are shown in Table 6.

TABLE 6

| | comparative example 11 | comparative example 12 | example 9 |
|---|---|---|---|
| | | parts by weight | |
| base paint | 100 | 100 | 100 |
| methyl ethyl ketoxime | 0.50 | | 0.10 |
| methyl isobutyl ketoxime | | 0.50 | |
| 2,4-pentanedione | | | 1.0 |
| time required for development of skin (days) | 35 | 35 | 42 |
| drying times at 23° C. (hrs:min) | | | |
| dust-free | 3:00 | 3:15 | 3:00 |
| tack-free | 3:15 | 3:45 | 3:15 |
| drying times at 5° C. (hrs:min) | | | |
| dust-free | 6:30 | >11:00 | 6:30 |
| tack-free | 10:30 | | 10:30 |

The test results in Table 6 shows that an anti-skinning composition according to this invention (example 9) brings about an at least equal anti-skinning performance and unaffected drying times. Methyl isobutyl ketoxime shows a less negative tox profile and a higher boiling point compared to methyl ethyl ketoximes, yet retards the oxidative drying of the coating composition.

The invention claimed is:

1. A coating composition comprising an oxidatively drying binder and an anti-skinning agent, wherein the coating composition is substantially free of aluminum-organic ligand complexes, and wherein the anti-skinning agent comprises:
   a) a diketone of formula I

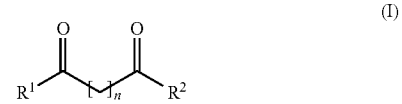

(I)

wherein
n is an integer selected from 1 and 2; and
$R^1$ is selected from $C_{1-24}$alkyl, $C_{6-20}$aryl, $C_{6-20}$aryl $C_{1-12}$alkyl, heteroaryl, and heteroaryl$C_{1-12}$alkyl, each being optionally substituted with one or more substituents each independently selected from $C_{1-6}$alkyl, —OH, and halogen;
$R^2$ is selected from $C_{1-24}$alkyl, $C_{6-20}$aryl, $C_{6-20}$aryl $C_{1-12}$alkyl, heteroaryl, and heteroaryl$C_{1-12}$alkyl, each being optionally substituted with one or more substituents each independently selected from $C_{1-6}$alkyl, —OH, and halogen; or
$R^1$ taken together with $R^2$ form a 4, 5, 6, 7, 8, 9 or 10-membered carbon ring, optionally substituted with one or more substituents each independently selected from $C_{1-6}$alkyl, —OH, and halogen; and b) an aldoxime or ketoxime of formula II

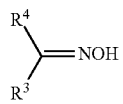

(II)

wherein $R^3$ is hydrogen or is selected from $C_{1-24}$alkyl, $C_{6-20}$aryl, $C_{6-20}$aryl$C_{1-12}$alkyl, heteroaryl, and heteroaryl $C_{1-12}$alkyl, each being optionally substituted with one or more substituents each independently selected from $C_{1-6}$alkyl, —OH, and halogen;

$R^4$ is hydrogen or is selected from $C_{1-24}$alkyl, $C_{6-20}$aryl, $C_{6-20}$aryl$C_{1-12}$alkyl, heteroaryl, and heteroaryl $C_{1-12}$alkyl, each being optionally substituted with one or more substituents each independently selected from $C_{1-6}$alkyl, —OH, and halogen; or $R^3$ taken together with $R^4$ form a 5, 6, 7, 8, 9 or 10-membered carbon ring, optionally substituted with one or more substituents each independently selected from $C_{1-6}$alkyl, —OH, and halogen.

2. The coating composition according to claim 1, the coating composition further comprising at least one metal complex comprising at least one metal, wherein the at least one metal is selected from cobalt (Co), manganese (Mn), iron (Fe), vanadium (V), cerium (Ce), copper (Cu), lead (Pb), calcium (Ca), zirconium (Zr), lanthanum (La), neodymium (Nd), bismuth (Bi), strontium (Sr), zinc (Zn), lithium (Li), potassium (K), and barium (Ba).

3. The coating composition according to claim 2, wherein the metal complex is a metal salt of an organic acid.

4. The coating composition according to claim 1, wherein $R^1$ is methyl and $R^2$ is methyl.

5. The coating composition according to claim 1, wherein n is 1.

6. The coating composition according to claim 1, wherein the diketone of formula (I) is 2,4-pentanedione.

7. The coating composition according to claim 1, wherein the diketone of formula (I) is present in a concentration of at least 0.5% by weight, with % by weight based on the total weight of the coating composition.

8. The coating composition according to claim 1, wherein the aldoxime or ketoxime of formula (II) is selected from methyl ethyl ketoxime, dimethyl ketoxime, cyclohexanone oxime, methyl isobutyl ketoxime, formaldehyde oxime, acetaldehyde oxime, propionaldehyde oxime, butyraldehyde oxime, isobutyraldehyde oxime, pentan-2-one oxime, pentan-3-one oxime, cyclopentanone oxime, 3-methylbutyraldehyde oxime, hexan-2-one oxime, heptanal oxime, heptan-2-one oxime, heptan-3-one oxime, heptan-4-one oxime, 2,4-dimethylpentan-3-one oxime, 5-methylhexan-2-one oxime, benzaldehyde oxime, salicylaldoxime, acetophenone oxime, benzophenone oxime, 3-pyridinealdoxime, and 4-pyridinealdoxime.

9. The coating composition according to claim 1, wherein the aldoxime or ketoxime of formula (II) is present in a concentration of at least 0.01% by weight and at most 0.40% by weight, with % by weight based on the total weight of the coating composition.

10. The coating composition according to claim 1, wherein the oxidatively drying binder is an alkyd binder.

11. The coating composition according to claim 1, wherein the coating composition is substantially free of aluminium.

12. The coating composition according to claim 1, wherein said coating comprises a varnish, lacquer, paint, stain, enamel, printing ink, or floor covering.

13. A substrate having applied thereon a coating composition according to claim 1.

14. The coating composition of claim 3, wherein the metal salt of an organic acid comprises a cobalt (Co) salt of an organic acid, a calcium (Ca) salt of an organic acid, and/or a zirconium (Zr) salt of an organic acid.

15. The coating composition of claim 2, wherein the metal comprises cobalt (Co), manganese (Mn), iron (Fe), vanadium (V), cerium (Ce), copper (Cu), and/or lead (Pb).

* * * * *